US007079679B2

(12) United States Patent  (10) Patent No.: US 7,079,679 B2
Kirk et al.  (45) Date of Patent: Jul. 18, 2006

(54) IMAGE PROCESSING APPARATUS

(75) Inventors: Richard Antony Kirk, Hertfordshire (GB); Alexander Ralph Lyons, Bracknell (GB); Adam Michael Baumberg, Bracknell (GB); Richard Ian Taylor, Bracknell (GB); Aaron William Christopher Kotcheff, London (GB)

(73) Assignee: Canon Kabushiki Kaisha, Tokyo (JP)

( * ) Notice: Subject to any disclaimer, the term of this patent is extended or adjusted under 35 U.S.C. 154(b) by 838 days.

(21) Appl. No.: 09/963,635

(22) Filed: Sep. 27, 2001

(65) Prior Publication Data

US 2002/0061130 A1 May 23, 2002

(30) Foreign Application Priority Data

Sep. 27, 2000 (GB) .................................. 0023681.0

(51) Int. Cl.
G06K 9/00 (2006.01)
(52) U.S. Cl. ...................................................... 382/154
(58) Field of Classification Search ................ 382/154; 345/419, 424; 348/42; 356/12
See application file for complete search history.

(56) References Cited

U.S. PATENT DOCUMENTS

| 5,815,683 | A | 9/1998 | Vogler .......................... 395/500 |
| 5,960,125 | A | 9/1999 | Michael et al. .............. 382/294 |
| 6,072,898 | A | 6/2000 | Beaty et al. ................. 382/146 |
| 6,128,405 | A * | 10/2000 | Fujii ............................ 382/154 |
| 6,356,272 | B1 * | 3/2002 | Matsumoto et al. ......... 345/582 |
| 6,621,921 | B1 * | 9/2003 | Matsugu et al. ............. 382/154 |
| 2001/0056308 | A1 | 12/2001 | Petrov et al. .................. 700/98 |
| 2002/0050988 | A1 | 5/2002 | Petrov et al. ............... 345/418 |

FOREIGN PATENT DOCUMENTS

| EP | 0 548 629 A | 6/1993 |
| EP | 0 790584 A2 | 8/1997 |
| EP | 0 794516 A2 | 9/1997 |
| EP | 0 794517 A2 | 9/1997 |

(Continued)

OTHER PUBLICATIONS

Wolfgang Niem, Image and Vision Computing 17, University of Hannover, "Automatic Reconstruction of 3D Objects Using a Mobile Camera," 1999, (pp. 125-134).

(Continued)

Primary Examiner—Vikkram Bali
(74) Attorney, Agent, or Firm—Fitzpatrick, Cella, Harper & Scinto

(57) ABSTRACT

In an image processing system, a subject object 210 is placed on top of an object support 220 on a calibration object 34 having a known pattern of features thereon. Images recorded at different positions and orientations are processed to generate a three-dimensional computer model of the subject object alone or the subject object together with the calibration object. By imaging the subject object 210 on an object support instead of placing it directly on the calibration object, the user is provided with flexibility in the selection of the pattern and color of the calibration and the selection of the imaging positions and orientations. By providing an object support 220 having a top surface on which the subject object 210 sits which does not protrude from beneath the base of the subject object 210, the user is provided with flexibility in the selection of lighting conditions. By imaging the subject object 210 with a background screen 228 behind it, the user is provided with flexibility in the selection of the surface on which the calibration object 34 is placed for imaging.

37 Claims, 22 Drawing Sheets

FOREIGN PATENT DOCUMENTS

| EP | 0 898245 A1 | 2/1999 |
|---|---|---|
| EP | 0 901 105 A1 | 3/1999 |
| EP | 0 930583 A1 | 7/1999 |
| GB | 2325996 A | 12/1998 |
| JP | 9170914 | 6/1997 |
| WO | WO 98/18117 | 4/1998 |
| WO | WO 00 04506 A | 1/2000 |
| WO | WO 01/39124 A2 | 5/2001 |

OTHER PUBLICATIONS

Wolfgang Niem, University of Hannover, "Automatic Reconstruction of 3D Objects Using a Mobile Monoscopic Camera," (pp. 1-8).

Steven J. Gorler et al., Computer Graphics Proceedings, Annual Conference Series, "The Lumigraph," 1996, ACM-0-89791-764-4/96/008.

Richard Szeliski, "Rapid Octree Construction From Image Sequences," CVGIP: Image Understanding, vol. 58, No. 1, Jul. 1993, (pp. 23-30 and 47-48).

William E. Lorensen and Harvey E. Cline, "Marching Cubes: A High Resolution 3D Surface Construction Algorithm," Computer Graphics, SIGGRAPH 87 Proceedings, Jul. 1987, (21: pp. 163-169).

Jules Bloomenthal, "An Implicit Surface Polygonizer," Graphics Gems IV, AP Professional, 1994, ISBN 0123361559, (pp. 324-350).

Richard I Hartley, "Euclidean Reconstruction From Unclibrated Views," Applications of Invariance in Computer Vision, Mundy/Zisserman/Forsyth eds., 1993, (pp. 237-256).

Kiriakos N. Kutulakos and Steven M. Seitz, University of Rochester Computer Sciences Technical Reports No. 680, "What Do N Photographs Tell Us About 3D Shape," Jan. 1998, (pp. 1-8).

Kiriakos N. Kutulakos and Steven M. Seitz, University of Rochester Computer Sciences Technical Reports No. 692,"A Theory of Shape By Space Carving," May 1998, (pp. 1-27).

P. Eisert, E. Steinbach, and B. Girod, *Automatic Reconstruction of Stationary 3-D Objects From Multiple Uncalibrated Camera Views,* IEEE Transactions on Circuits and Systems for Video Technology, vol. 10, No. 2 (Mar. 2000), pp. 261-277.

A.W. Fitzgibbon et al., "Automatic 3D Model Construction for Turn-Table Sequences", Lecture Notes In Computer Science, Springer Verlag, New York, NY, US, Jun. 6, 1998, pp. 155-170.

\* cited by examiner

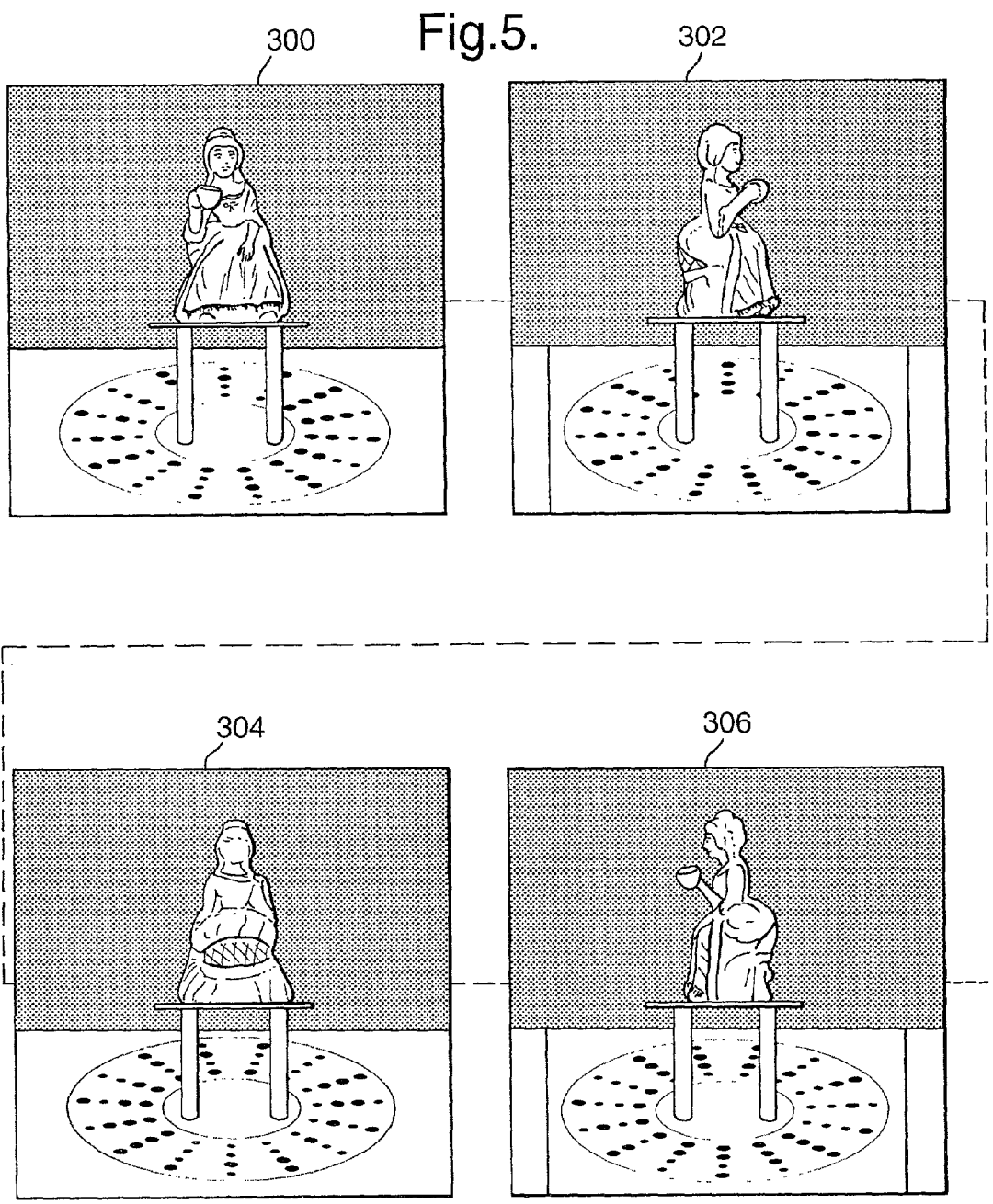

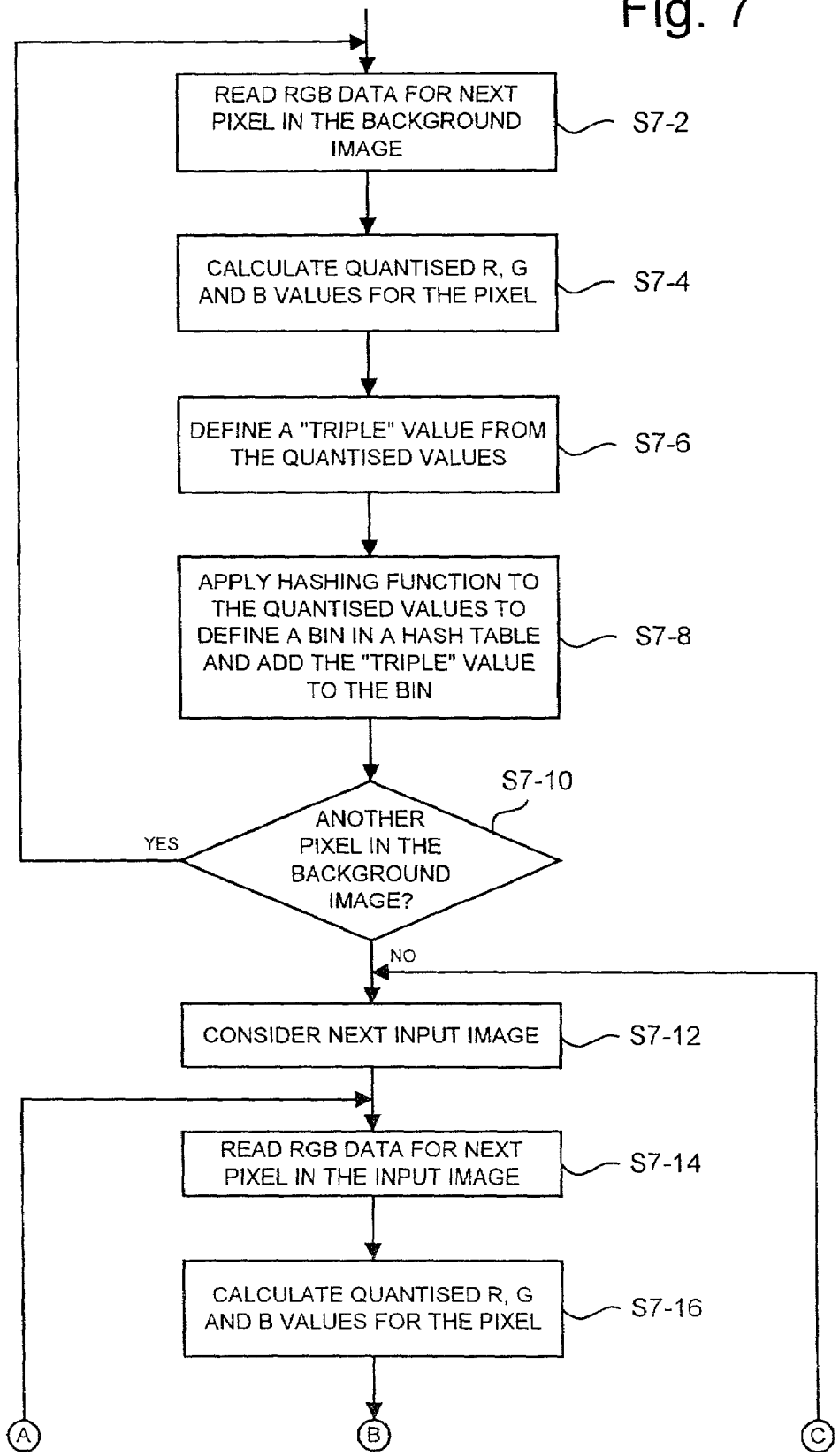

450

450

450

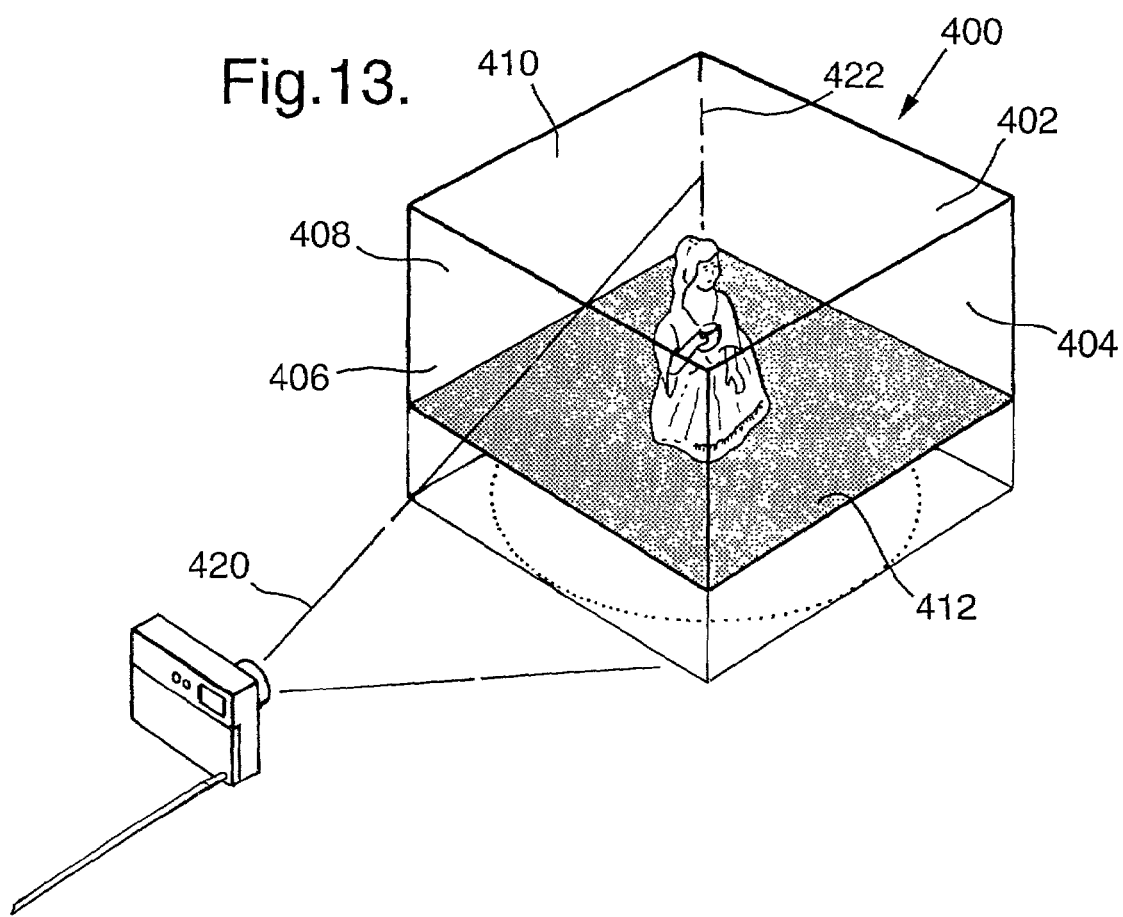

IMAGE PROCESSING APPARATUS

The present invention relates to the recording of images of an object and the computer processing of the image data to determine the positions and orientations at which the images were recorded and to generate a three-dimensional (3D) computer model of the object. More particularly, the present invention relates to the use of a patterned calibration object for imaging together with the object, and the computer processing of the image data to determine the imaging positions and orientations on the basis of the calibration object's pattern in the images and to generate data defining a 3D computer model of the object using the calculated positions and orientations.

3D computer models of objects are useful for many applications. In particular, 3D computer models are often used in computer games and for computer aided design (CAD) applications. In addition, there is now a growing demand to have 3D computer models of objects for uses such as the embellishment of Internet sites etc.

Many methods are known for generating 3D computer models of objects. In particular, a method is known in which a subject object to be modelled is placed on a flat two-dimensional calibration object having a known pattern of features thereon, and images of the subject object together with the calibration object are recorded at different positions and orientations. Each recorded image is then processed to calculate the position and orientation at which is was recorded on the basis of the positions of the features in the calibration object's pattern in the image. Subsequently, a 3D computer model of the subject object is generated using the input images and the calculated positions and orientations.

Examples of this method are described, for example, in "Automatic Reconstruction of 3D Objects Using A Mobile Camera" by Niem in Image and Vision Computing 17 (1999) pages 125–134, "The Lumigraph" by Gortler et al in Computer Graphics Proceedings, Annual Conference Series, 1996 ACM-0-89791-764-4/96/008, JP-A-9-170914 and the applicant's earlier co-pending PCT patent application PCT/GB00/04469 (WO-A-01/39124) (the full contents of which are incorporated herein by cross-reference).

The inventors in the present case have found that this known method suffers from a number of problems, however.

More particularly, the inventions in the present case have found that 3D computer models generated using this method can be inaccurate.

Accordingly, it is an object of the present invention to address this problem.

The inventors of the present invention have recognised that inaccuracies in 3D computer models are caused by a number of factors as set out below.

More particularly, shadows are often cast on the calibration object which appear to connect to the bottom of the subject object. Accordingly, in recorded images, the processing apparatus may not distinguish between the subject object and shadow, in which case the shadow is therefore determined to be part of the subject object. This problem is compounded because, if the subject object and calibration object are moved relative to the camera in order to record images at different positions and orientations, then the shadows move. On the other hand, if the camera itself is moved, the shadows cast by the camera move.

Similarly, features in the pattern on the calibration object often touch the subject object in a two-dimensional recorded image and are therefore determined by the processing apparatus to be part of the subject object.

Similarly, features on the surface on which the subject object and calibration object are placed for imaging (such as marks on a floor or table) often touch the outline of the subject object in a recorded image, and are therefore determined by the processing apparatus to be part of the subject object.

Further, it is often desirable to choose the colour of the calibration object to emphasise (contrast) the pattern of features thereon (to assist detection in input images by the processing apparatus). However, the colour of the calibration object is often reflected onto the subject object so that the 3D computer model is generated with an incorrectly coloured surface.

Yet further, it is difficult to record images of the subject object at low elevation angles. This is because, for such angles, the pattern of features on the calibration object on which the subject object is sitting is distorted in the images to such an extent that detection of the features in input images by the processing apparatus in a reliable manner is not possible. By not being able to record images from low elevation angles, input images showing in detail parts of the subject object may not be available, resulting in those parts being inaccurately reproduced in the 3D computer model.

Accordingly, it is an object of the present invention to address one or more of these problems.

In terms of solutions, the inventors have recognised that the problem of shadows could be addressed by using diffuse illumination which is symmetrical about the subject object and calibration object. However, this is very difficult and/or expensive to achieve in practice.

Accordingly, it is an object of the present invention to provide a different solution.

According to the present invention, there is provided a method of recording and processing images of a subject object to generate a three-dimensional computer model, in which the subject object is held in a fixed configuration relative to a calibration object by an object support while images are recorded at different camera positions and orientations, the image data is processed to determine the imaging positions and orientations on the basis of features from the calibration object visible in the images, and a three-dimensional computer model of the subject object alone or the subject object together with the object support is generated using the calculated positions and orientations.

The present invention also provides apparatus components for carrying out the above method, including a processing apparatus and a computer program, and methods relating thereto.

By imaging the subject object away from the surface of the calibration object (for example on an object stand) instead of placing the subject object directly on the calibration object, the user is provided with greater flexibility in the selection of the pattern on the calibration object, the selection of the colour of the calibration object and the selection of imaging positions and orientations. This is because the problem of features from the pattern on the calibration object appearing to touch the subject object in input images, the problem of the calibration object colour being reflected onto the subject object and the problem of recording input images form low elevation angles are all addressed by moving the subject object away from the calibration object.

Preferably, the top surface of the object support on which the subject object is placed is shaped and sized so that there is no horizontal surface of any substantial size protruding from beneath the base of the subject object when the subject object is placed on the object support. In this way, the user is provided with greater flexibility in the selection of lighting conditions because the problem of shadows appearing as part of the subject object in input images is also addressed.

Preferably, the subject object is imaged with a screen behind it. In this way, the user is provided with greater flexibility in the selection of the surface on which the calibration object, object support and subject object are placed for imaging because the problem of marks on the surface appearing as part of the subject object in input images is addressed.

Embodiments of the invention will now be described, by way of example only, with reference to the accompanying drawings, in which:

FIG. 1 schematically shows the components of an embodiment of the invention, together with the notional functional processing units into which the processing apparatus component can be thought of as being configured when programmed by programming instructions;

FIG. 5 illustrates images of the object, object support and photographic mat which are input to the processing apparatus in FIG. 1;

FIG. 13 illustrates the re-definition of an initial volume on which to perform voxel carving at step S11-8 in FIG. 11;

First Embodiment

Figure 1:
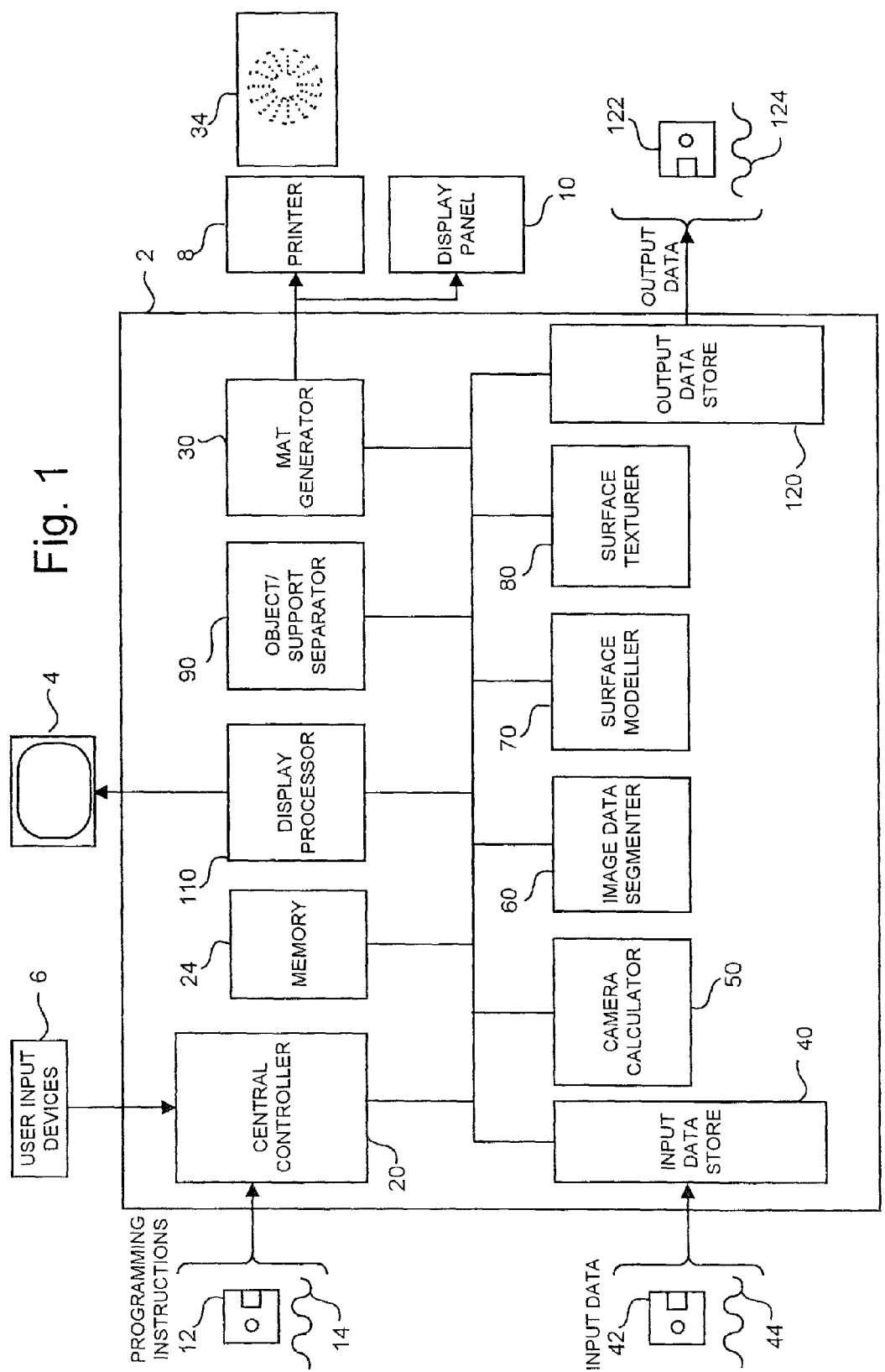

Referring to FIG. 1, an embodiment of the invention comprises a processing apparatus 2, such as a personal computer, containing, in a conventional manner, one or more processors, memories, graphics cards etc, together with a display device 4, such as a conventional personal computer monitor, user input devices 6, such as a keyboard, mouse etc, a printer 8, and a display panel 10 comprising a flat panel having controllable pixels, such as the PL400 manufactured by WACOM.

The processing apparatus 2 is programmed to operate in accordance with programming instructions input, for example, as data stored on a data storage medium, such as disk 12, and/or as a signal 14 input to the processing apparatus 2, for example form a remote database, by transmission over a communication network (not shown) such as the Internet or by transmission through the atmosphere, and/or entered by a user via a user input device 6 such as a keyboard.

As will be described in more detail below, the programming instructions comprise instructions to cause the processing apparatus 2 to become configured to process input data defining a plurality of images of one or more subject objects recorded at different positions and orientations to calculate the positions and orientations at which the input images were recorded and to use the calculated positions and orientations to generate data defining a three-dimensional computer model of the subject object(s). In this embodiment, the subject object is placed on an object support and the subject object and support are imaged on a calibration object (a two-dimensional photographic mat in this embodiment) which has a known pattern of features thereon. The positions and orientations at which the input images were recorded are calculated by detecting the positions of the features of the calibration object pattern in the images. As will be explained in more detail below, by using an object support to image the subject object, accurate three-dimensional computer models of the subject object can be consistently obtained.

When programmed by the programming instructions, processing apparatus 2 can be thought of as being configured as a number of functional units for performing processing operations. Examples of such functional units and their interconnections are shown in FIG. 1. The units and interconnections illustrated in FIG. 1 are, however, notional and are shown for illustration purposes only to assist understanding; they do not necessarily represent units and connections into which the processor, memory etc of the processing apparatus 2 become configured.

Referring to the functional units shown in FIG. 1, a central controller 20 processes inputs from the user input devices 6, and also provides control and processing for the other functional units. Memory 24 is provided for use by central controller 20 and the other functional units.

Mat generator 30 generates control signals to control printer 8 or display panel 10 to print a photographic mat 34 on a recording medium such as a piece of paper, or to display the photographic mat on display panel 10. As will be described in more detail below, the photographic mat comprises a predetermined pattern of features and the subject object(s) for which a three-dimensional computer model is to be generated is placed on an object support on the printed photographic mat 34 or on the display panel 10 on which the photographic mat is displayed. Images of the subject objects), object support and the photographic mat are then recorded and input to the processing apparatus 2.

The colour of the recording medium on which printer 8 prints the photographic mat is chosen to maximise the contrast between the recording medium and the features in the pattern of the photographic mat (thereby increasing the likelihood that the features will be located accurately in the input images by processing apparatus 2). The colour can be freely chosen in this embodiment without having an adverse effect on the 3D computer model subsequently generated because the effect of light reflected from the printed photographic mat onto the subject object is minimised by placing the subject object on an object support and thereby raising the subject object away from the photographic mat. It has been found in practice that light, unsaturated colours give good results when chosen as the colour of the recording medium.

Mat generator 30 stores data defining the pattern of features printed or displayed on the photographic mat for use by the processing apparatus 2 in calculating the positions and orientations at which the input images were recorded. More particularly, mat generator 30 stores data defining the pattern of features together with a coordinate system relative to the pattern of features (which, in effect, defines a reference position and orientation of the photographic mat), and processing apparatus 2 calculates the positions and orientations at which the input images were recorded in the defined coordinate system (and thus relative to the reference position and orientation).

In this embodiment, the pattern on the photographic mat comprises spatial clusters of features for example as described in co-pending PCT patent application PCT/GB00/04469 (WO-A-01/39124) (the full contents of which are incorporated herein by cross-reference) or any known pattern of features, such as a pattern of coloured dots, with each dot having a different hue/brightness combination so that each respective dot is unique, for example as described in JP-A-9-170914, a pattern of concentric circles connected by radial line segments with known dimensions and position markers in each quadrant, for example as described in "Automatic Reconstruction of 3D Objects Using A Mobile Camera" by Niem in Image and Vision Computing 17 (1999) pages 125–134, or a pattern comprising concentric rings with different diameters, for example as described in "The Lumigraph" by Gortler et al in Computer Graphics Proceedings, Annual Conference Series, 1996 ACM-0-89791-764-4/96/008.

In the remainder of the description of this embodiment, it will be assumed that the pattern is printed by printer 8 on a recording medium (in this embodiment, a sheet of paper) to generate a printed photographic mat 34, although, as mentioned above, the pattern could be displayed on display panel 10 instead.

Input data store 40 stores input data input to the processing apparatus 2 for example as data stored on a storage device, such as disk 42, as a signal 44 transmitted to the processing apparatus 2, or using a user input device 6. The input data defines a plurality of images recorded at different positions and orientations showing one or more subject objects and an object support on the photographic mat. In this embodiment, the input data also defines an input image showing the background against which the subject object(s) and object support were imaged, together with part of the photographic mat to show the background colour thereof or a different object having the same colour as the background colour of the mat. In addition, in this embodiment, the input data also includes data defining the intrinsic parameters of the camera which recorded the images, that is, the aspect ratio, focal length, principal point (the point at which the optical axis intersects the imaging plane), first order radial distortion coefficient, and skew angle (the angle between the axes of the pixel grid; because the axes may not be exactly orthogonal).

The input data defining the input images may be generated for example by downloading pixel data from a digital camera which recorded the images, or by scanning photographs using a scanner (not shown). The input data defining the intrinsic camera parameters may be input by a user using a user input device 6.

Camera calculator 50 processes each input image to detect the positions in the image of the features on the photographic mat and to calculate the position and orientation of the camera when the input image was recorded.

Image data segmenter 60 processes each input image to separate image data corresponding to the subject object and object support from other image data in the image.

Surface modeller 70 processes the segmented image data produced by image data segmenter 60 and the data defining the positions and orientations at which the images were recorded generated by camera calculator 50, to generate data defining a 3D computer model representing the actual surfaces of the subject object(s) and object support in the input images.

Surface texturer 80 generates texture data from the input image data for rendering onto the surface model produced by surface modeller 70.

Object/support separator 90 performs processing to amend the three-dimensional computer model of the subject object and object support generated by surface modeller 70 to delete the part of the model corresponding to the object support, so as to leave a three-dimensional computer model of the subject object alone.

Display processor 110, under the control of central controller 20, displays instructions to a user via display device 4. In addition, under the control of central controller 20, display processor 110 also displays images of the 3D computer model form a user-selected viewpoint by processing the surface model data generated by surface modeller 70 and/or object/support separator 90 and rendering texture data produced by surface texturer 80 onto the surface model.

Output data store 120 stores the camera positions and orientations calculated by camera calculator 50 for each input image, the image data relating to the subject object and object support from each input image generated by image data segmenter 60, and also the surface model and texture data therefor generated by surface modeller 70, object/support separator 90, and surface texturer 80. Central controller 20 controls the output of data from output data store 120, for example as data on a storage device, such as disk 122, and/or as a signal 124.

Figure 2:
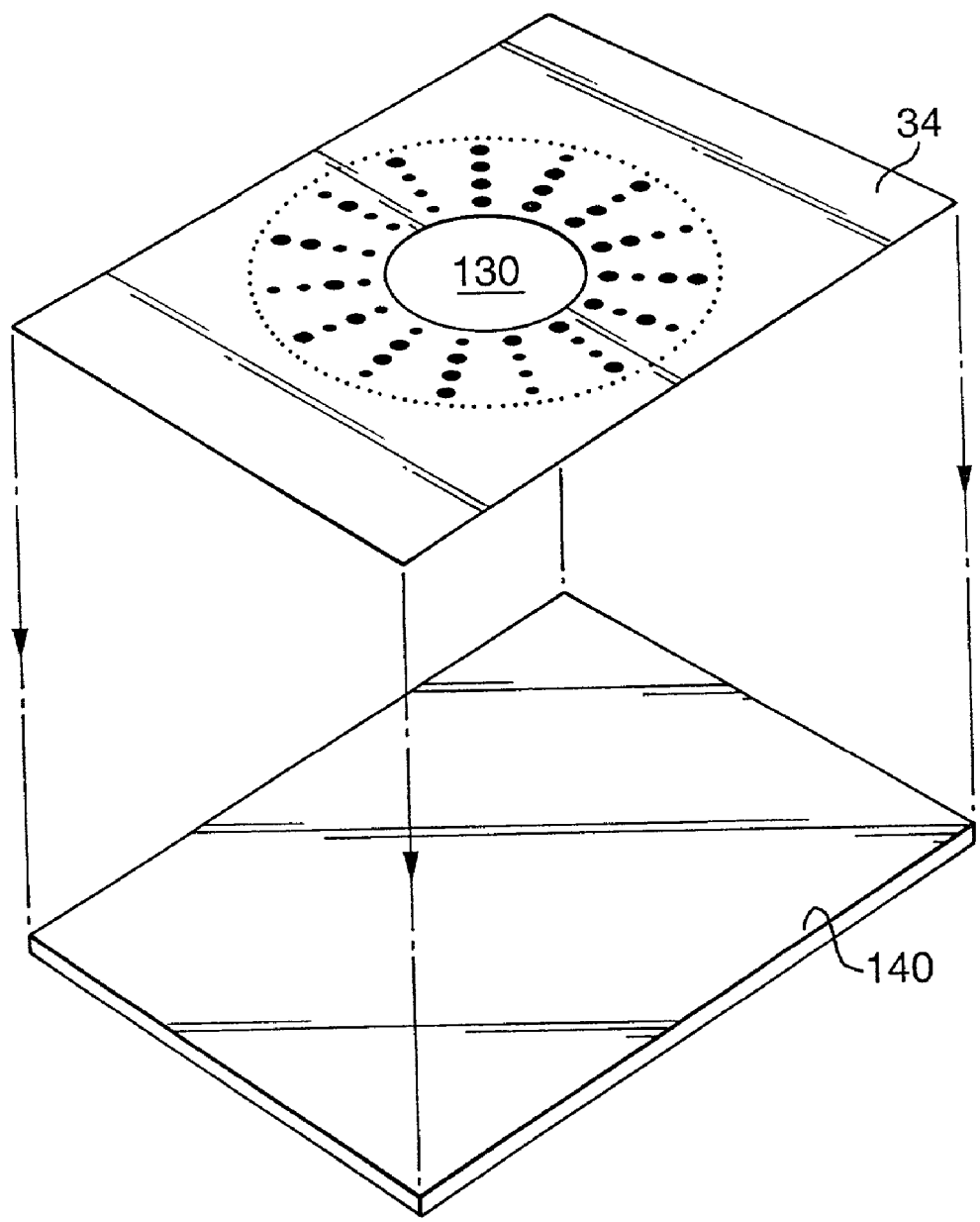
FIG. 2 illustrates the connection of a photographic mat to a mirror.

Referring to FIG. 2, in this embodiment the pattern of features on the photographic mat 34 is printed by printer 8 around a central blank area which is cut out to leave a hole 130 in the photographic mat 34.

The photographic mat 34 with the hole 130 therein is then attached to a mirror 140, for example by gluing. As will be explained in more detail below, hole 130 and mirror 140 enable the reflection of the bottom surface of the subject object to be seen in input images, and hence texture data for she bottom surface of the subject object in the three-dimensional computer model can be generated.

Figure 3:
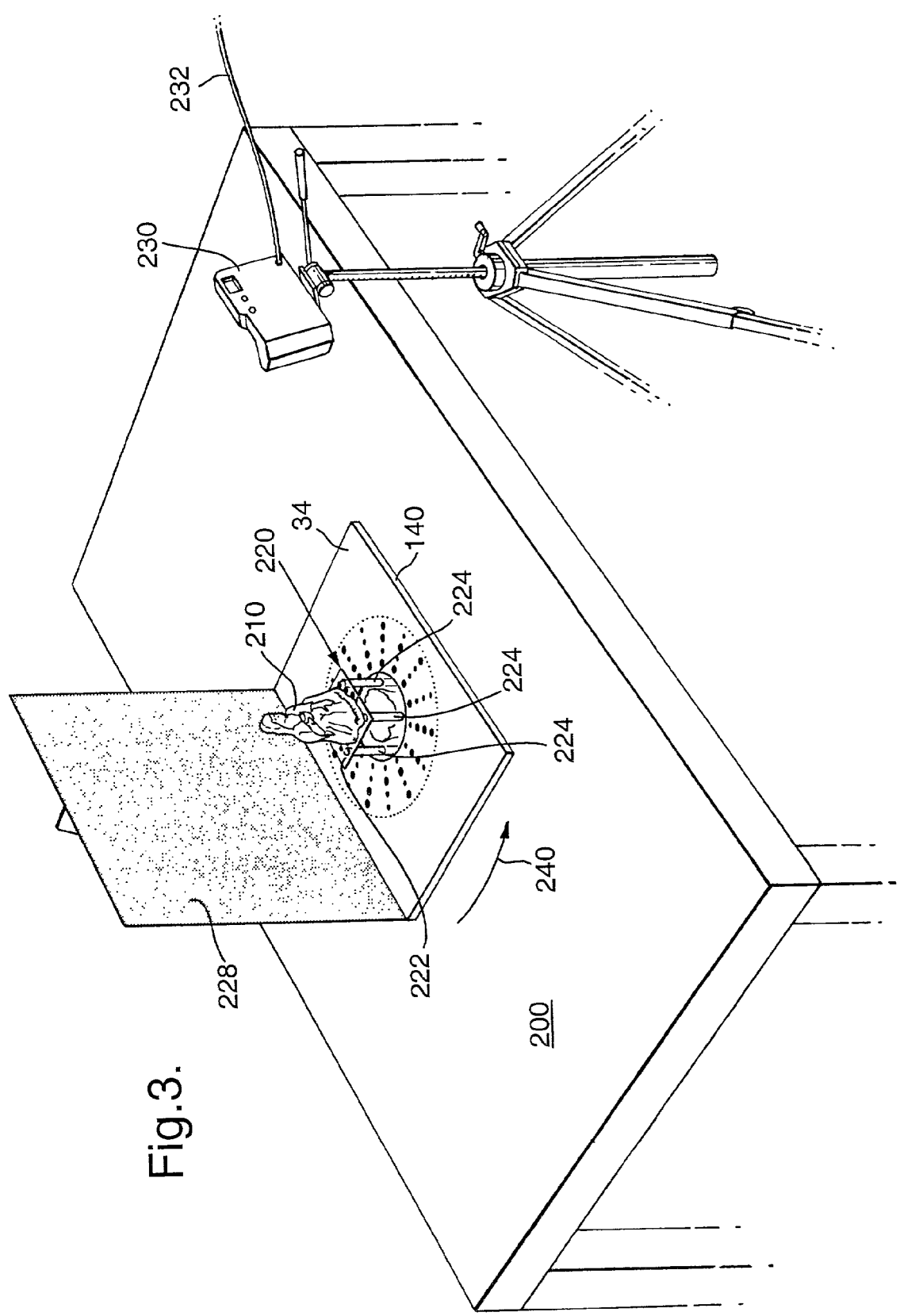
FIG. 3 illustrates the recording of images of a subject object for which a 3D computer model is to be generated, together with an object support and photographic mat.

Referring to FIG. 3, the mirror 140 with the printed photographic mat 34 attached thereto is placed on a flat surface 200, and the subject object 210 for which a 3D computer model is to be generated is placed on an object support 220 on the photographic mat 34 so that the object support 220 is positioned in the hole 130 and is surrounded by the features making up the pattern on the mat.

By raising subject object 210 off the photographic mat 34 using object support 220, any shadows on the photographic mat 34 will touch the object support 220 and not the subject object 210. Similarly, features in the pattern on the photographic mat will appear to touch only the object support 220 and not the subject object 210 in recorded images. Accordingly in the 3D computer model generated by processing apparatus 2, errors may occur in the model of the object support 220 but the subject object 210 will be accurately modelled. However, the errors in the object support 220 are unimportant and, in this embodiment, object/support separator 90 removes the 3D computer model of the object support 220 leaving a 3D computer model of the subject object 210 on its own.

Yet further, as will be explained below, by raising the subject object 210 above the photographic mat 34, images at low elevation angles can be recorded in which the pattern of features on the photographic mat 34 is not distorted to such an extent that processing apparatus 2 cannot perform processing to identify the features in the input images and calculate the imaging positions and orientations. Accordingly, the accuracy of the 3D computer model of the subject object 210 is further increased because images showing the necessary detail of the subject object 210 can be recorded and processed.

In this embodiment, the object support 220 comprises a horizontal plate 222 of a transparent material, such as glass, supported by four cylindrical opaque legs 224. Accordingly, because the horizontal plate 222 is transparent, the bottom surface of the subject object 210 is visible as a reflection in the mirror 140.

A background screen 228 of a substantially uniform colour is placed behind the subject object 210 and object support 220. In this way, no part of the subject object 210 (or object support 220) appears against the surface 200 in recorded images. Instead, the subject object 210 appears only against the background screen. This allows the user to choose freely the surface 200 on which the photographic mat 34 is placed, because marks on the surface 200 or regions of non-uniform colour on the surface 200, etc. will not touch the outline of the subject object 210 in any input image. Accordingly, as will be explained in more detail below, the use of background screen 228 assists in separating image data relating to the subject object 210 and object support 220 from other image data during segmentation processing by image data segmenter 60.

Images of the subject object 210, object support 220 and photographic mat 34 are recorded at different positions and orientations to show different parts of subject object 210 using a digital camera 230. In this embodiment, data defining the images recorded by camera 230 is input to processing apparatus 2 as a signal 44 along wire 232.

More particularly, in this embodiment, camera 230 and background screen 228 remain in fixed positions and photographic mat 34 with the subject object 210 and object support 220 thereon is moved (translated) and rotated (for example in the direction of arrow 240) on surface 200, and photographs of the subject object 210 at different positions and orientations relative to the camera 230 are recorded. During the rotation and translation of the photographic mat 34 on surface 200, the subject object 210 and object support 220 do not move relative to the mat 34.

FIGS. 4a to 4e illustrate how, in this embodiment, the location and viewing angle of camera 230 are chosen and how the height of the object support 220 is chosen.

Figure 4A:
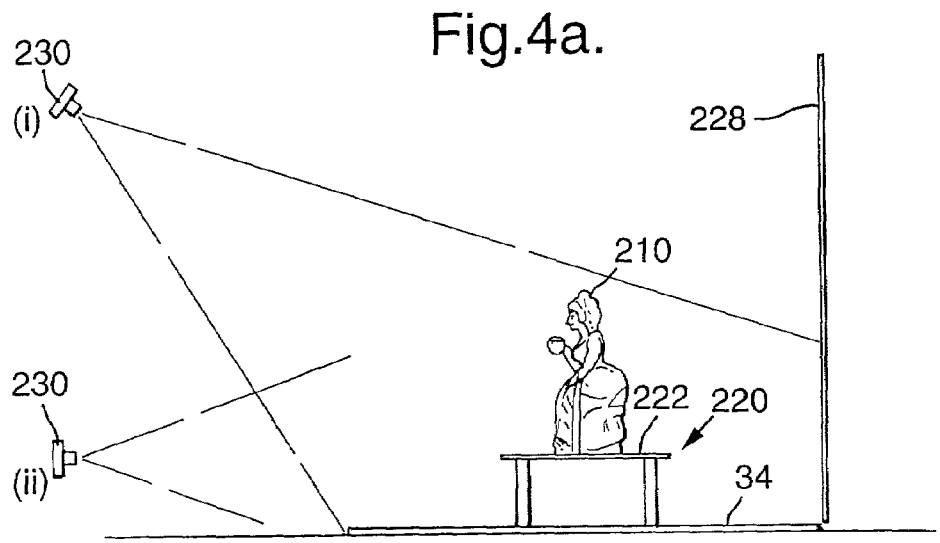
FIGS. 4a–4e illustrate how the choice of camera viewing position and orientation and the choice of height of object support affect the input images recorded by the camera.
Figure 4B:
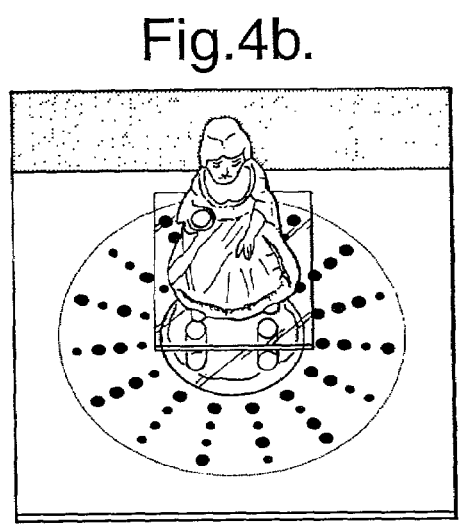

Referring to FIG. 4a, if camera 230 is located in position (i), that is, a highly elevated position looking down on the subject object 210, then, as shown in FIG. 4b, in each image recorded by camera 230, the top part of the subject object 210 will be outlined against the background screen 228, but the bottom part of the subject object 210 will be outlined against the photographic mat 34 and/or the horizontal plate 222 of the object support 220. This is undesirable because any shadows on the horizontal plate 222 and photographic mat 34 may appear as part of the subject object 210 and hence may not be separated from the subject object 210 by image data segmenter 60. Similarly, one or more features in the pattern on the photographic mat 34 may touch the subject object 210 in an input image (and hence appear to be part of the subject object 210), and may not therefore be separated from the subject object 210 by image data segmenter 60.

Figure 4C:
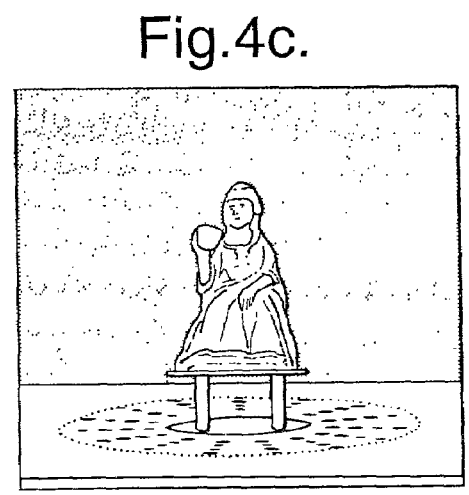

Accordingly, a more desirable imaging location and viewing direction is that marked (ii) in FIG. 4a, in which the optical axis of the camera 230 is substantially in line with the horizontal plate 222 of the object stand 220. However, if the height of the horizontal plate 222 above photographic mat 34 is too low (as is the case in the example shown in FIG. 4a), then, as shown in FIG. 4c, in each input image recorded by camera 230, the photographic mat 34 will appear distorted to such an extent that the features in the pattern thereon can not be distinguished from each other.

Figure 4D:
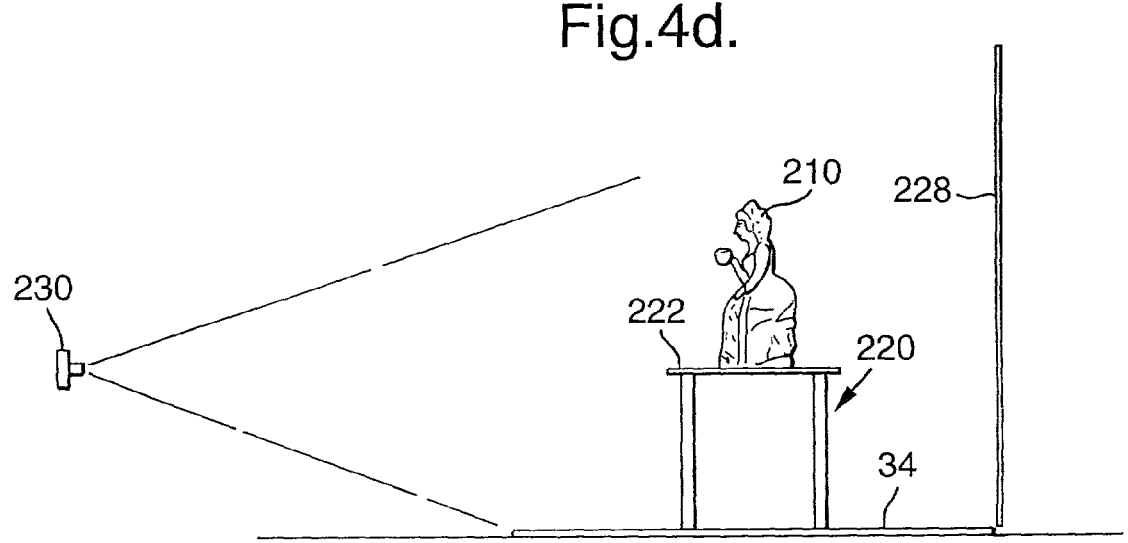
Figure 4E:
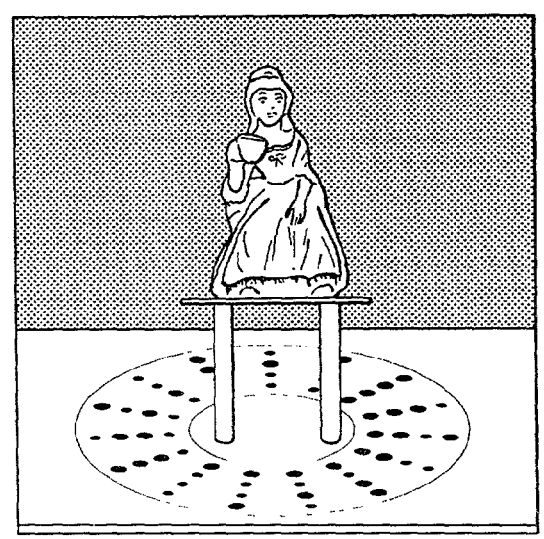

Consequently, as shown in FIG. 4d, the position and viewing direction of camera 230 are chosen so that the optical axis of the camera is substantially in line with the horizontal plate 222 of the object support 220, and the height of the object support 220 is chosen so that the pattern of features on the photographic mat 34 is not distorted in the input images. In this way, referring to FIG. 4e, which shows an example of an input image recorded using the configuration shown in FIG. 4d, the subject object 210 is surrounded by the background screen 228 (thereby enabling image data segmenter 60 to segment image data relating to the subject object 210 more accurately) and the features in the pattern on the photographic mat 34 can be distinguished from each other (thereby enabling camera calculator 50 to detect the position of each feature in an input image and hence determine the position and orientation at which the input image was recorded). It should be noted that the background screen 228 does not need to extended to the edges of the input images (as is the case in the example shown in FIG. 4e), but only needs to be extended above, below and to the sides of the subject object 210 so that the subject object 210 is surrounded thereby.

In summary, by raising the subject object 210 off the photographic mat 34 (this being achieved in this embodiment using object support 220) input images can be recorded in which shadows on the photographic mat 34 and features in the pattern on photographic mat 34 do not touch the outline of the subject object 210. Further, the colour of the photographic mat 34 can be freely chosen to emphasise the features in the pattern thereon because the colour is reflected much less onto the subject object 210. Further, images of the subject object 210 can be recorded at low elevation angles, ensuring that suitable images are available to model all parts of the subject object 210 accurately in the 3D computer model.

In addition, by placing background screen 228 behind the subject object 210, the choice of surface 200 can be freely made because input images can be recorded in which no part of the surface 200 is seen to touch the subject object 210.

FIG. 5 shows examples of input images 300, 302, 304 and 306 of the subject object 210, object support 220 and photographic mat 34 in different positions and orientations relative to camera 230.

In this embodiment, following the recording and input of images of subject object 210, object support 220 and photographic mat 34, a further image is recorded and input to processing apparatus 2. This further image comprises a "background image", which is an image of the surface 200, background screen 228 and an object having the same colour as the paper on which photographic mat 34 is printed. Such a background image may be recorded by placing a blank sheet of paper having the same colour as the sheet on which photographic mat 34 is recorded on surface 200 in front of the background screen 228, or by turning the photographic mat 34 over on surface 200 so that the pattern thereon is not visible in the image.

Figure 6:
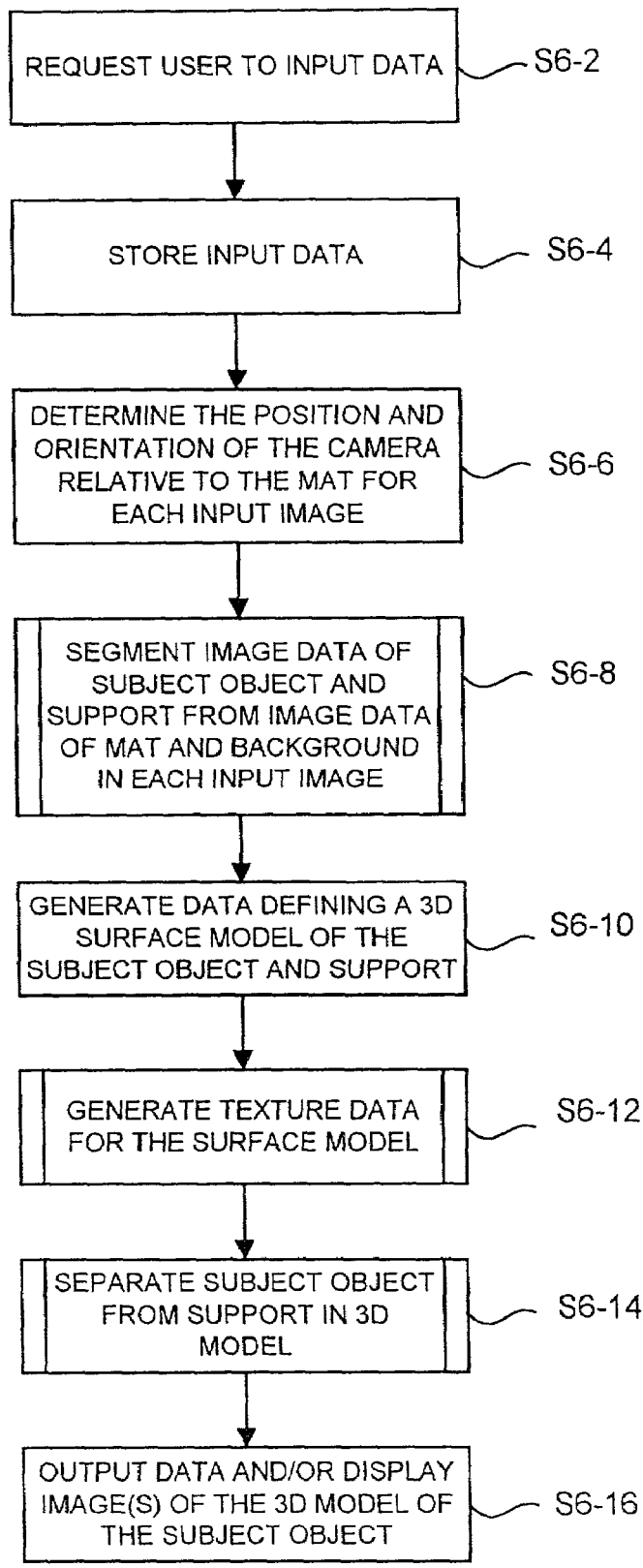
FIG. 6 shows the processing operations performed by the processing apparatus in FIG. 1 to process input data.

FIG. 6 shows the processing operations performed by processing apparatus 2 to process input data in this embodiment.

Referring to FIG. 6, at step S6-2, central controller 20 causes display processor 110 to display a message on display device 4 requesting the user to input data for processing.

At step S6-4, data input by the user in response to the request at step S6-2 is stored in the input data store 40. More particularly, in this embodiment, the input data comprises image data defining the images of the subject object 210, object support 220 and mat 34 recorded at different positions and orientations relative to the camera 230, the "background image" showing the surface 200 on which photographic mat 34 was placed to record the input images together with the background screen 228 and an object having the same colour as the recording material on which the pattern of photographic mat 34 is printed, and data defining the intrinsic parameters of the camera 230 which recorded the input images, that is the aspect ratio, focal length, principal point (the point at which the optical axis intersects the imaging plane), the first order radial distortion coefficient, and the skew angle (the angle between the axes of the pixel grid).

At step S6-6, camera calculator 50 processes the input data stored at step S6-4 to determine the position and orientation of the camera 230 relative to the photographic mat 34 (and hence relative to the subject object 210 and object support 220) for each input image. This processing comprises, for each input image, detecting the features in the image which make up the pattern on the photographic mat 34 and comparing the features to the stored pattern for the photographic mat to determine the position and orientation of the camera 230 relative to the mat. The processing performed by camera calculator 50 at step S6-6 depends upon the pattern of features used on the photographic mat 34. Accordingly, suitable processing is described, for example, in co-pending PCT patent application PCT/GB00/04469 (WO-A-01/39124), JP-A-9-170914, "Automatic Reconstruction of 3D Objects Using A Mobile Camera" by Niem in Image and Vision Computing 17 (1999) pages 125–134 and "The Lumigraph" by Gortler et al in Computer Graphics Proceedings, Annual Conference Series, 1996 ACM-0-89791-764-4/96/008.

At step S6-8, image data segmenter 60 processes each input image to segment image data representing the subject object 210 and object support 220 from image data representing the photographic mat 34, the surface 200 on which the mat 34 is placed and the background screen 228 (step S6-8 being a preliminary step in this embodiment to generate data for use in the subsequent generation of a 3D computer model of the surface of subject object 210 and object support 220, as will be described in more detail below).

Figure 7:
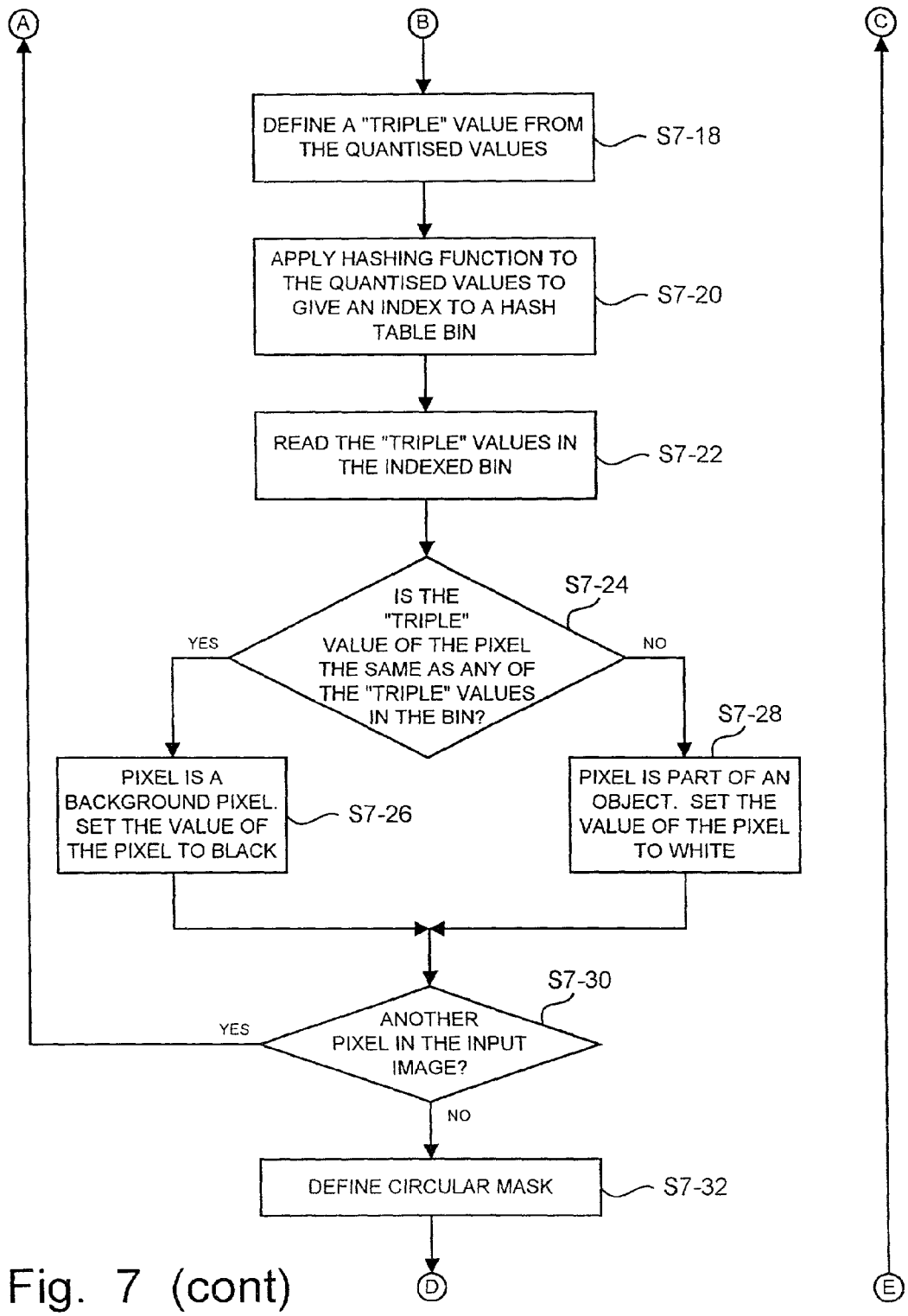
FIG. 7 shows the processing operations performed at step S6-8 in FIG. 6.
Figure 7:
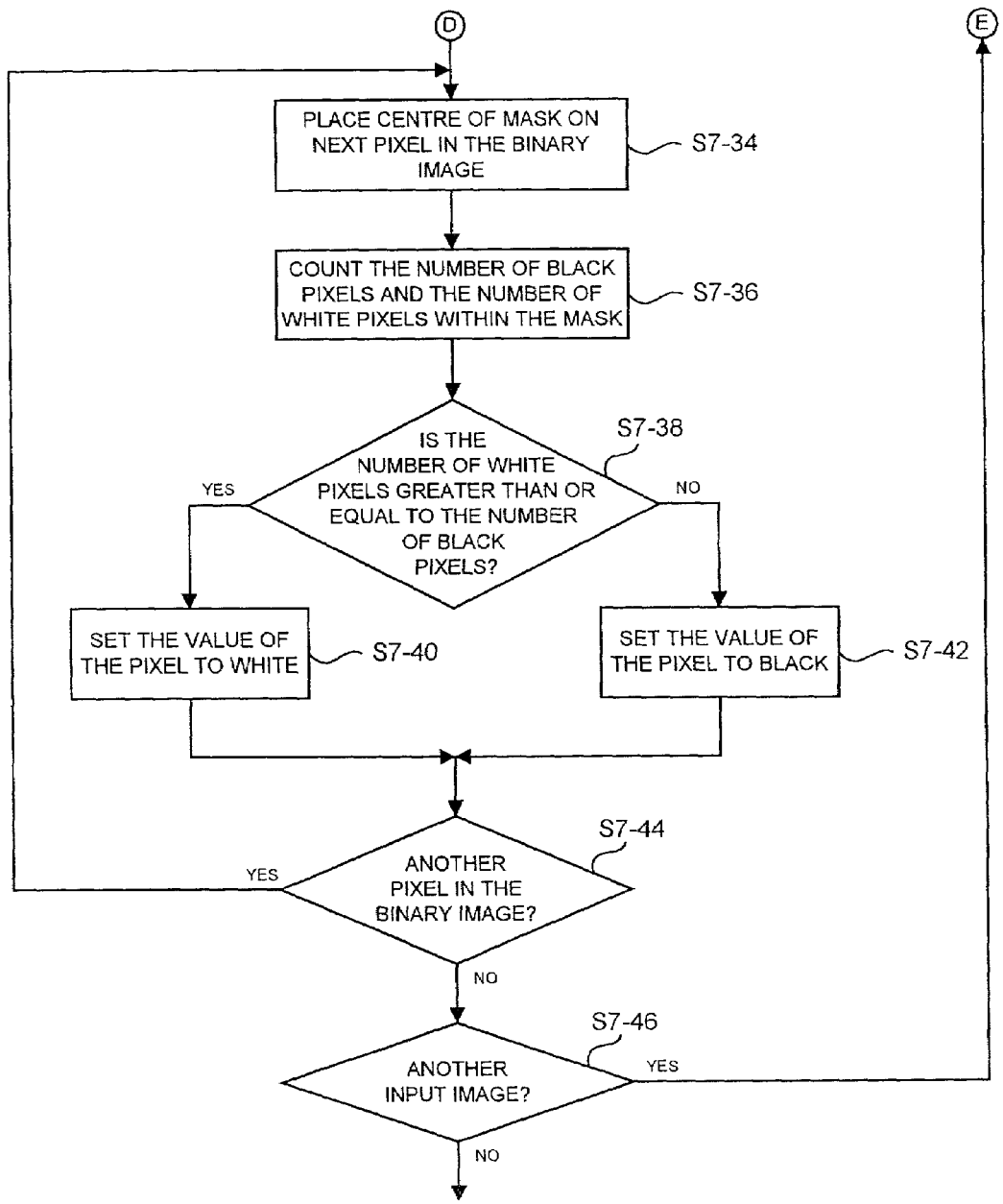

FIG. 7 shows the processing operations performed by image data segmenter 60 at step S6-8.

Referring to FIG. 7, at steps S7-2 to S7-10, image data segmenter 60 builds a hash table of quantised values representing the colours in the input images which represent the photographic mat 34, the surface 200 and the background screen 228 but not the subject object 210 and object support 220.

More particularly, at step S7-2, image data segmenter 60 reads the RBG data values for the next pixel in the "background image" stored at step S6-4 in FIG. 6 (that is, the final image to be input to processing apparatus 2 which shows the surface 200, the background screen 228 and an object having the same colour as the material on which photographic mat 34 is printed).

At step S7-4, image data segmenter 60 calculates a quantised red (R) value, a quantised green (G) and a quantised blue (B) value for the pixel in accordance with the following equation:

$$q = \frac{(p + t/2)}{t} \quad (1)$$

where:
"q" is the quantised value;
"p" is the R, G or B value read at step S7-2;
"t" is a threshold value determining how near RGB values from an input image showing the subject object 210 need to be to background colours to be labelled as background. In this embodiment, "t" is set to 4.

At step S7-6, image data segmenter 60 combines the quantised R, G and B values calculated at step S7-4 into a "triple value" in a conventional manner.

At step S7-8, image data segmenter 60 applies a hashing function to the quantised R, G and B values calculated at step S7-4 to define a bin in a hash table, and adds the "triple" value defined at step S7-6 to the defined bin. More particularly, in this embodiment, image data segmenter 60 applies the following hashing function to the quantised R, G and B values to define the bin in the hash table:

$$h(q) = (q_{red} \& 7)*2^6 + (q_{green} \& 7)*2^3 + (q_{blue} \& 7) \quad (2)$$

That is, the bin in the hash table is defined by the three least significant bits of each colour. This function is chosen to try and spread out the data into the available bins in the hash table, so that each bin has only a small number of "triple" values. In this embodiment, at step S7-8, the "triple" value is added to the bin only if it does not already exist therein, so that each "triple" value is added only once to the hash table.

At step S7-10, image data segmenter 60 determines whether there is another pixel in the background image. Steps S7-2 to S7-10 are repeated until each pixel in the "background" image has been processed in the manner described above. As a result of this processing, a hash table is generated containing values representing the colours in the "background" image.

At steps S7-12 to S7-48, image data segmenter 60 considers each input image in turn and uses the hash table to segment the data in the input image relating to the photographic mat 34, the background screen 228 and the surface 200 from the data in the input image relating to the subject object 210 and object support 220.

In this embodiment, the "background" image processed at steps S7-2 to S7-10 to generate the hash table does not show the features on the photographic mat 34. Accordingly, the segmentation performed at steps S7-12 to S7-46 does not distinguish pixel data relating to the subject object 210 and object support 220 from pixel data relating to a feature on the mat 34. Instead, in this embodiment, the processing performed by surface modeller 70 to generate the 3D computer model of the surface of subject object 210 and object support 220 is carried out in such a way that pixels relating to a feature on photographic mat 34 do not contribute to the surface model, as will be described in more detail below.

At step S7-12, image data segmenter 60 considers the next input image, and at step S7-14 reads the R, G and B values for the next pixel in the input image (this being the first pixel the first time step S7-14 is performed).

At step S7-16, image data segmenter 60 calculates a quantised R value, a quantised G value and a quantised B value for the pixel using equation (1) above.

At step S7-18, image data segmenter 60 combines the quantised R, G and B values calculated at step S7-16 into a "triple value".

At step S7-20, image data segmenter 60 applies a hashing function in accordance with equation (2) above to the quantised values calculated at step S7-16 to define a bin in the hash table generated at steps S7-2 to S7-10.

At step S7-22, image data segmenter 60 reads the "triple" values in the hash table bin defined at step S7-20, these "triple" values representing the colours of the material of the photographic mat 34, the background screen 228 and the surface 200.

At step S7-24, image data segmenter 60 determines whether the "triple" value generated at step S7-18 of the pixel in the input image currently being considered is the same as any of the background "triple" values in the hash table bin.

If it is determined at step S7-24 that the "triple" value of the pixel is the same as a background "triple" value, then, at step S7-26, it is determined that the pixel is a background pixel and the value of the pixel is set to "black".

On the other hand, if it is determined at step S7-24 that the "triple" value of the pixel is not the same as any "triple" value of the background, then, at step S7-28, it is determined that the pixel is part of the subject object 210 or object support 220 and image data segmenter 60 sets the value of the pixel to "white".

At step S7-30, image data segmenter 60 determines whether there is another pixel in the input image. Steps S7-14 to S7-30 are repeated until each pixel in the input image has been processed in the manner described above.

At steps S7-32 to S7-44, image data segmenter 60 performs processing to correct any errors in the classification of image pixels as background pixels or object pixels.

More particularly, at step S7-32, image data segmenter 60 defines a circular mask for use as a median filter. In this embodiment, the circular mask has a radius of 4 pixels.

At step S7-34, image data segmenter 60 performs processing to place the centre of the mask defined at step S7-32 at the centre of the next pixel in the binary image generated at steps S7-26 and S7-28 (this being the first pixel the first time step S7-34 is performed).

At step S7-36, image data segmenter 60 counts the number of black pixels and the number of white pixels within the mask.

At step S7-38, image data segmenter 60 determines whether the number of white pixels within the mask is greater than or equal to the number of black pixels within the mask.

If it is determined at step S7-38 that the number of white pixels is greater than or equal to the number of black pixels, then, at step S7-40 image data segmenter 60 sets the value of the pixel on which the mask is centred to white. On the other hand, if it is determined at step S7-38 that the number of black pixels is greater than the number of white pixels then, at step S7-42, image data segmenter 60 sets the value of the pixel on which the mask is centred to black.

At step S7-44, image data segmenter 60 determines whether there is another pixel in the binary image, and steps S7-34 to S7-44 are repeated until each pixel has been processed in the manner described above.

At step S7-48, image data segmenter 60 determines whether there is another input image to be processed. Steps S7-12 to S7-48 are repeated until each input image has been processed in the manner described above.

Referring again to FIG. 6, at step S6-10, surface modeller 70 performs processing to generate data defining a 3D computer model of the surface of subject object 210 and the surface of object support 220.

Figure 8:
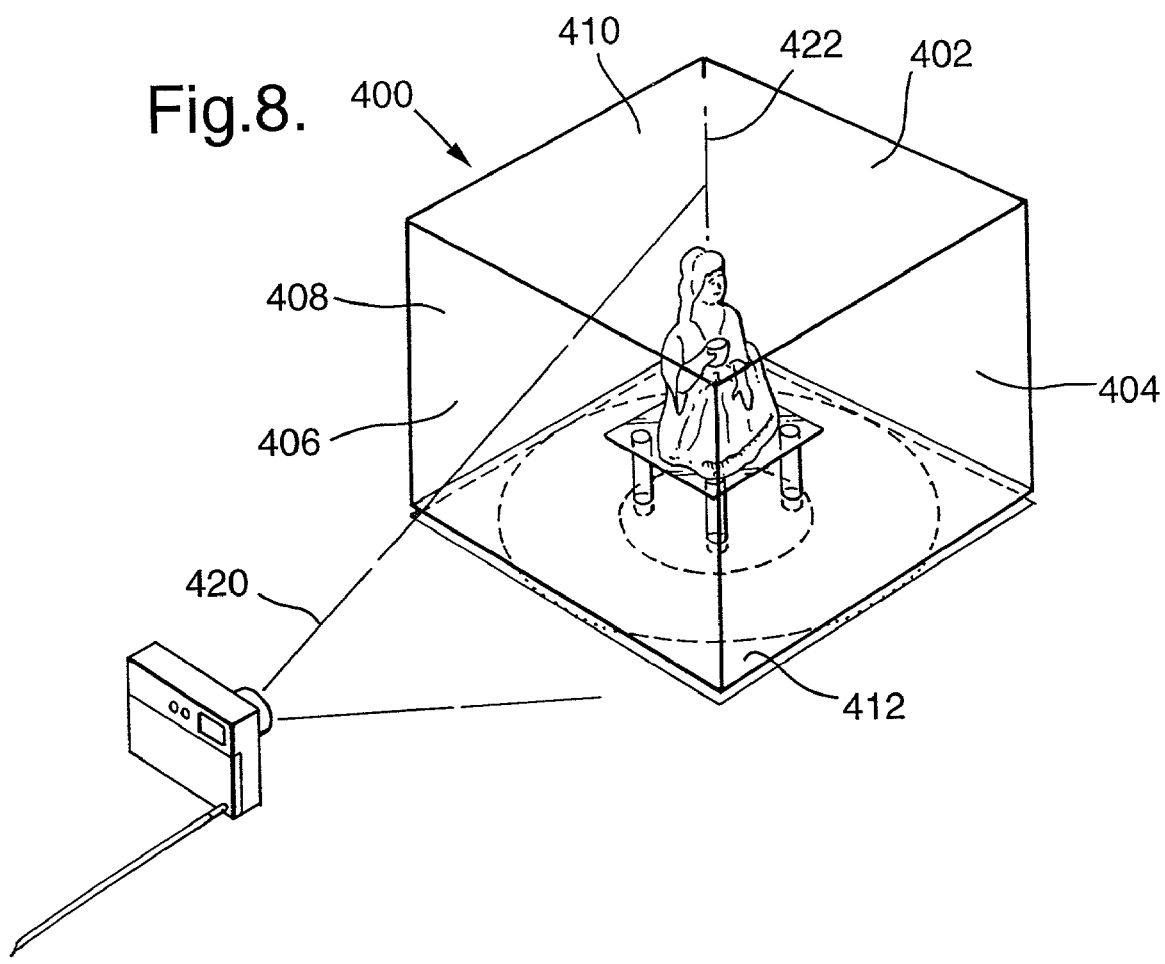
FIG. 8 illustrates the definition of an initial volume at step S6-10 in FIG. 6 on which to perform voxel carving operations to generate the 3D surface model of the subject object and object support.

In this embodiment, the processing at step S6-10 is performed in a conventional manner, and comprises the following three stages:

(1) The camera positions and orientations generated at step S6-6 and the segmented image data generated at step S6-8 is processed to generate a voxel carving, which comprises data defining the 3D grid of voxels enclosing the surface of subject object 210 and the surface of object support 220. Surface modeller 70 performs processing for this stage in a conventional manner, for example as described in "Rapid Octree Construction from Image Sequences" by R. Szeliski in CVGIP: Image Understanding, Volume 58, Number 1, Jul. 1993, pages 23–32. However, referring to FIG. 8, in this embodiment, the start volume defined by surface modeller 70 on which to perform the voxel carve processing comprises a cuboid 400 having vertical side faces 402, 404, 406, 408, a horizontal top face 410 and a horizontal bottom face 412. The vertical side faces 402, 404, 406, 408 are positioned so that they touch the edge of the pattern of features on the photographic mat 34 (as schematically represented by the outer dotted circle in FIG. 8). Accordingly, the vertical side faces wholly contain the subject object 210. The position of the top face 410 is defined by intersecting a line 420 from the focal point of the camera 230 through the top edge of any one of the input images stored at step S6-4 with a vertical line 422 through the centre of the photographic mat 34. More particularly, the focal point of the camera 230 and the top edge of an image are known as a result of the position and orientation calculations performed at step S6-6 and, by setting the height of the top face 410 to correspond to the point where the line 420 intersects a vertical line 422 through the centre of the photographic mat 34, the top face 410 will always be above the top of the subject object 210 (provided that the top of the subject object 210 is visible in each input image). The position of the horizontal base face 412 is set to be slightly above the plane of the photographic mat 34. By setting the position of the base face 412 in this way, features in the pattern on the photographic mat 34 (which were not separated from the subject object 210 and object support 220 in the image segmentation processing performed at step S6-8) will be disregarded during the voxel carving processing and a 3D surface model of the subject object 210 and object support 220 will be generated.

(2) The data defining the voxel carving is processed to generate data defining a 3D surface mesh of triangles defining the surface of the subject object 210 and the surface of the object support 220. In this embodiment, this stage of the processing is performed by surface modeller 70 in accordance with a conventional marching cubes algorithm, for example as described in W. E. Lorensen and H. E. Cline: "Marching Cubes: A High Resolution 3D Surface Construction Algorithm", in Computer Graphics, SIGGRAPH 87 proceedings, 21: 163–169, Jul. 1987, or J. Bloomenthal: "An Implicit Surface Polygonizer", Graphics Gems IV, AP Professional, 1994, ISBN 0123361559, pp 324–350.

(3) The number of triangles in the surface mesh generated at stage 2 is substantially reduced by performing a decimation process.

In stage 3, surface modeller 70 performs processing in this embodiment to carry out the decimation process by randomly removing vertices from the triangular mesh generated in stage 2 to see whether or not each vertex contributes to the shape of the surface of subject object 210 or the surface of object support 220. Vertices which do not contribute to the shape are discarded from the triangulation, resulting in fewer vertices (and hence fewer triangles) in the final model. The selection of vertices to remove and test is carried out in a random order in order to avoid the effect of gradually eroding a large part of the surface by consecutively removing neighbouring vertices. The decimation algorithm performed by surface modeller 70 in this embodiment is described below in pseudo-code.

Input
Read in vertices
Read in triples of vertex IDs making up triangles

Processing
Repeat NVERTEX times
   Choose a random vertex V, which hasn't been chosen before
   Locate set of all triangles having V as a vertex, S Order S so adjacent triangles are next to each other Re-triangulate triangle set, ignoring V (i.e. remove selected triangles & V and then fill in hole) Find the maximum distance between V and the plane of each triangle
   If (distance<threshold)
     Discard V and keep new triangulation
   Else
     Keep V and return to old triangulation Output
Output list of kept vertices
Output updated list of triangles Since the absolute positions of the features on photographic mat 34 are known (the features having been printed in accordance with prestored data defining the positions), the 3D computer model of the surface of subject object 210 and the surface of object support 220 is generated at step S6-10 to the correct scale.

At step S6-12, surface texturer 80 processes the input image data stored at step S6-4 to generate texture data for each triangle in the surface model generated by surface modeller 70 at step S6-10.

Figure 9:
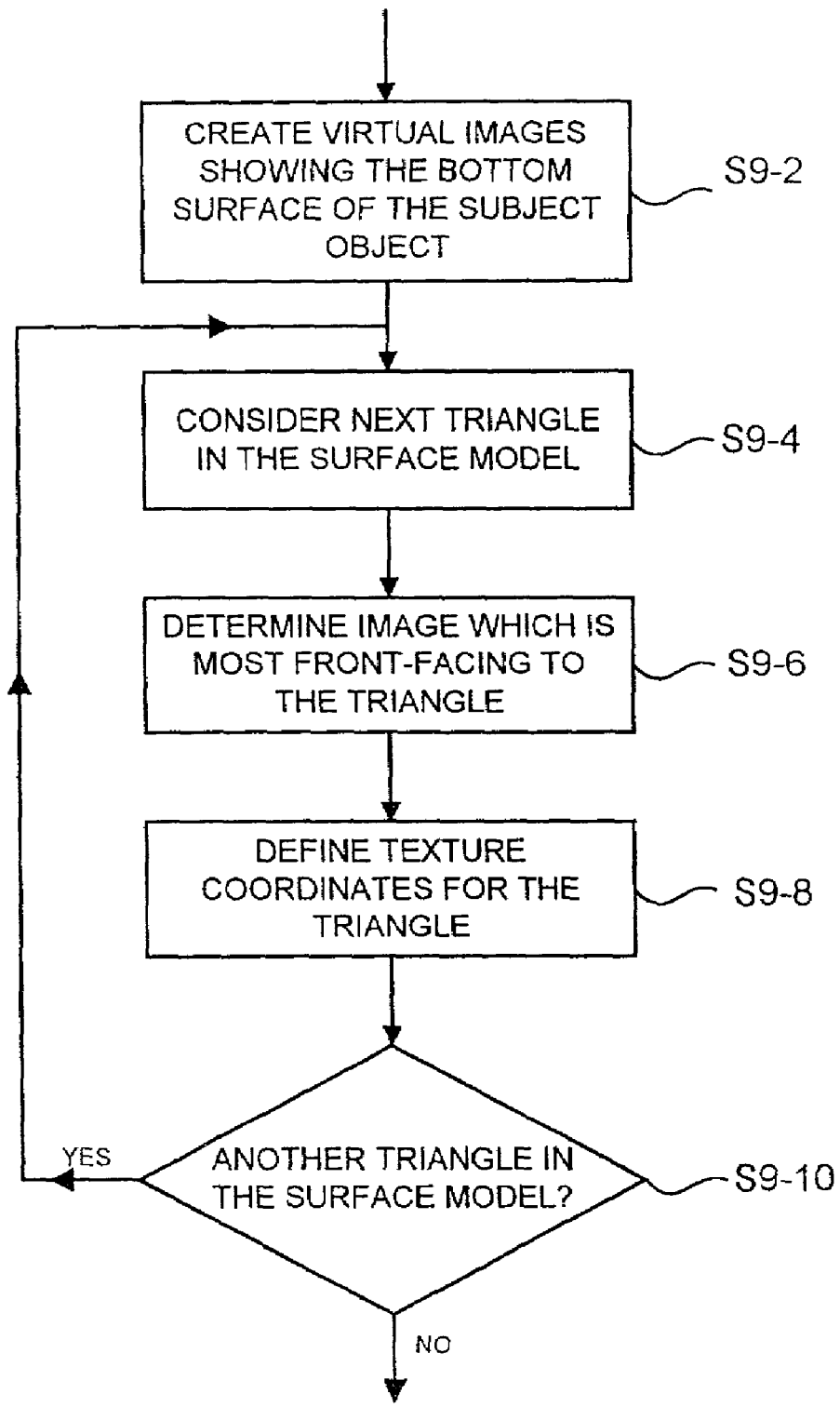
FIG. 9 shows the processing operations performed at step S6-12 in FIG. 6.

FIG. 9 shows the processing operations performed by surface texturer 90 at step S6-12 in this embodiment.

Referring to FIG. 9, at step S9-2, surface texturer 90 generates image data which can be used as texture data for the bottom surface of the subject object 210, that is the surface which sits on the horizontal plate 222 of the object support 220. In this embodiment, this processing is performed by converting each input image of the subject object 210 stored at step S6-4 into a virtual image having a camera viewing position and orientation such that the underside of the subject object 210 can be seen and comprising the pixel data from the input image which corresponds to the reflection of the underside of the subject object 210 in the mirror 140. More particularly, as noted previously, mat generator 30 stores data defining a coordinate system and camera calculator 50 calculates the position and orientation at which each input image was recorded in the defined coordinate system. In this embodiment, the centre of the photographic mat 34 is the origin of the coordinate system and the z-direction is the direction perpendicular to the plane of the photographic mat, pointing up. At step S9-2, surface texturer 80 processes each input image by changing the position and orientation of the input image calculated by camera calculator 50 to define a new position and orientation for the virtual image corresponding to a position and orientation which shows the underside of a subject object 210. More particularly, representing the position and orientation of the input image calculated by camera calculator 50 as a 3 by 4 matrix M, surface texturer 80 generates a 3 by 4 matrix M' defining the position and orientation of the virtual image as follows:

$$M' = M \begin{pmatrix} 1 & 0 & 0 & 0 \\ 0 & 1 & 0 & 0 \\ 0 & 0 & -1 & 0 \\ 0 & 0 & 0 & 1 \end{pmatrix} \quad (3)$$

Figure 10:
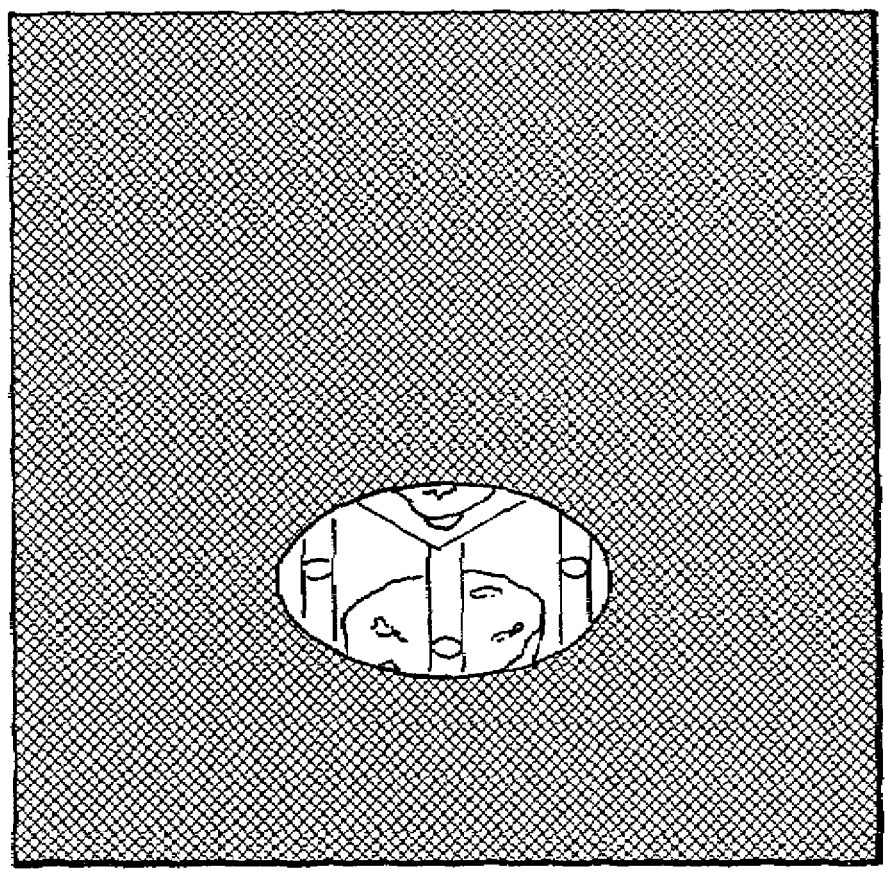
FIG. 10 illustrates the creation of pixel data for a virtual image at step S9-2 in FIG. 9.

Surface texturer 80 generates pixel data for each virtual image by masking out all pixels in the corresponding input image which do not correspond to the hole 130 in the photographic mat 34 (the position of hole 130 in the input image being known from the position and orientation calculations performed by camera calculator 50 at step S6-6). In this way, referring to FIG. 10, the pixel data for a virtual image comprises pixel data showing the reflection in the mirror 140 with all of the remaining pixel data masked out (indicated by the shading in FIG. 10).

It will be appreciated that, in some input images, the legs 224 of the object support 220 will appear in the reflection in mirror 140 and hence will appear in the corresponding virtual image. However, this is not a problem in this embodiment since, as will be clear from the description below, the texture data for the different triangles in the 3D computer model making up the bottom surface of subject object 210 does not necessarily come from the same input image, and therefore the effect of the legs 224 being visible in some of the input images will not be significantly noticeable. Alternatively, the legs 24 may be made of a transparent material, so that they are not visible in the reflection from mirror 140.

Referring again to FIG. 9, at steps S9-4 to S9-10, surface texturer 80 performs processing in a conventional manner to select each triangle in the surface mesh generated at step S6-10 and to define texture data from one of the input images for a selected triangle.

More particularly, at step S9-4, surface texturer 80 considers the next triangle in the surface mesh generated at step S6-10 (this being the first triangle the first time step S9-4 is performed) and, at step S9-6, performs processing to fend the input image "i" which is most front-facing to the triangle.

More particularly, at step S9-6, surface texturer 80 finds the input image for which the value $\hat{n}_t \cdot \hat{v}_i$ is largest, where $\hat{n}_t$ is the triangle normal and $\hat{v}_i$ is the viewing direction for the "i"th image. This identifies the input image in which the surface triangle has the largest projected area.

At step S9-8, surface texturer 80 projects the triangle into the input image identified at step S9-6, and stores the vertices of the projected triangle as texture coordinates defining an image texture map in a conventional manner.

At step S9-10, surface texturer 80 determines whether there is another triangle in the surface mesh, and steps S9-4 to S9-10 are repeated until each triangle has been processed in the manner described above.

The result of performing the processing described above is a VRML (or similar format) model of the surface of subject object 210 and the object support 220, complete with texture coordinates defining image data to be rendered onto the model.

Referring again to FIG. 6, at step S6-14, object/support separator 90 processes the data defining the 3D computer model of the surface of subject object 210 and the surface of object support 220 generated by surface modeller 70 at step S6-10 to remove the object support 220 from the model, leaving a 3D computer model of the subject object 210 alone.

In this embodiment, object/support separator 90 performs processing in accordance with user instructions input via a user input device 6 to remove interactively the object support 220 from the 3D computer model.

Figure 11:
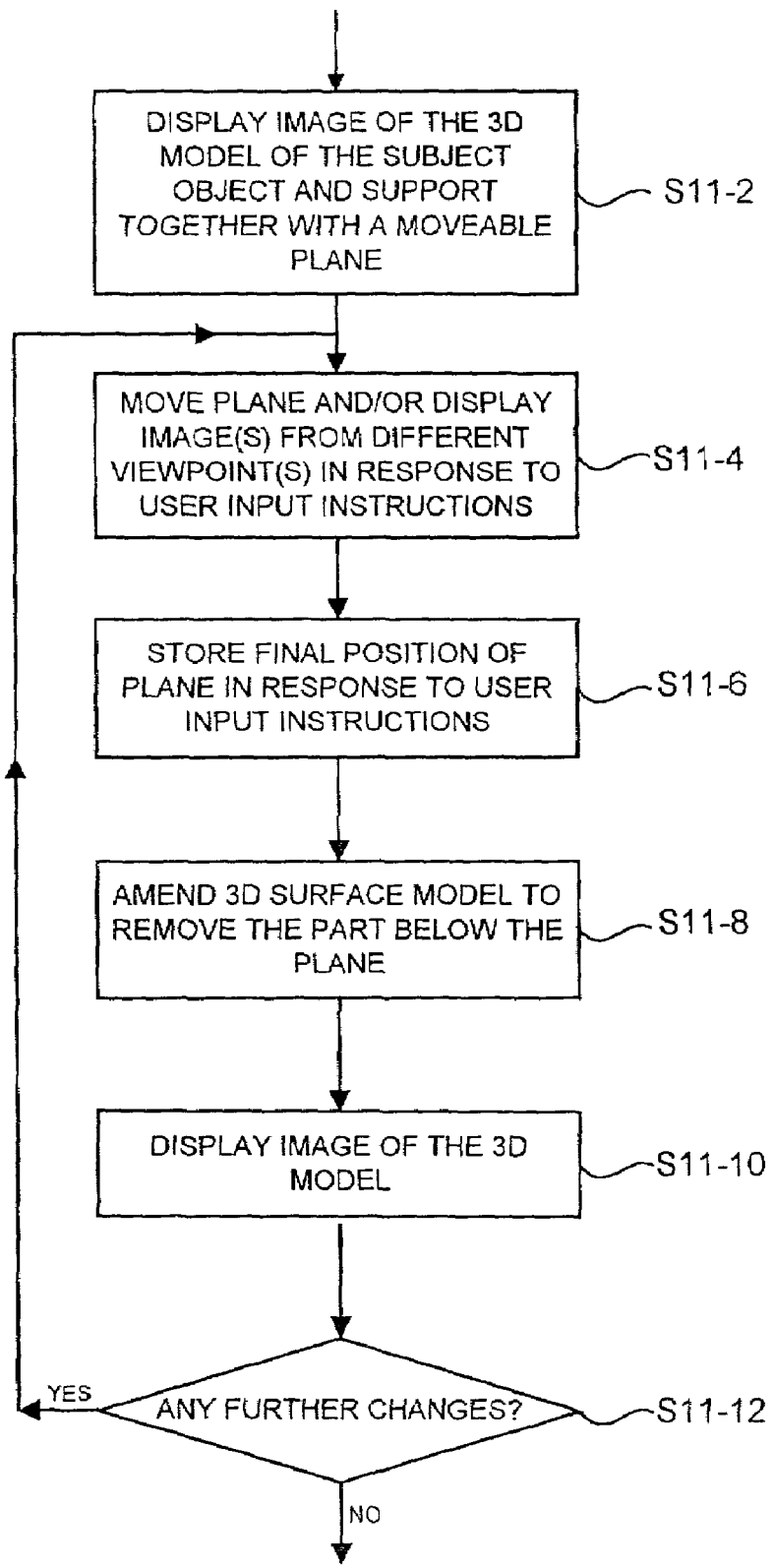
FIG. 11 shows the processing operations performed in the first embodiment at step S6-14 in FIG. 6.

FIG. 11 shows the processing operations performed by object/support separator 90 at step S6-14.

Referring to FIG. 11, at step S11-2, object/support separator 90 causes display processor 110 to display on display device 4 an image of the 3D computer model of the subject object 210 and object support 220 generated by surface modeller 70 rendered with texture data generated by surface texturer 80. In addition, referring to FIG. 12a, object/support separator 90 causes display processor 110 to display a horizontal plane 450 intersecting the displayed 3D computer model, the horizontal plane 450 being movable by the user in a vertical direction (that is, in a direction perpendicular to the photographic mat 34) using a user input device 6 such as a mouse.

Figure 12A:
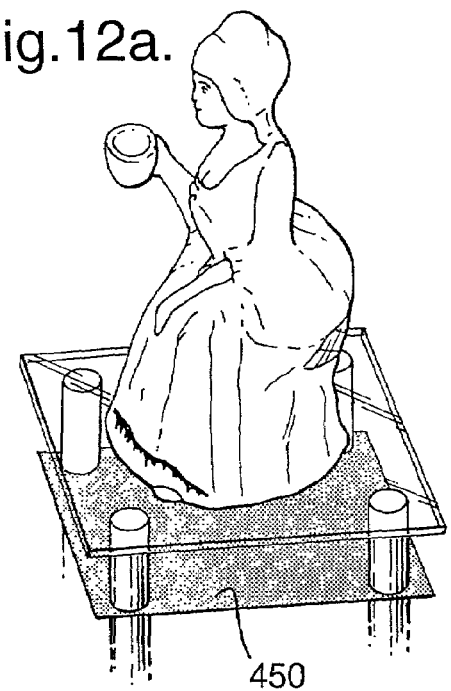
FIGS. 12a, 12b and 12c illustrate the display and movement of the moveable plane at steps S11-2 and S11-4 in FIG. 11.
Figure 12B:
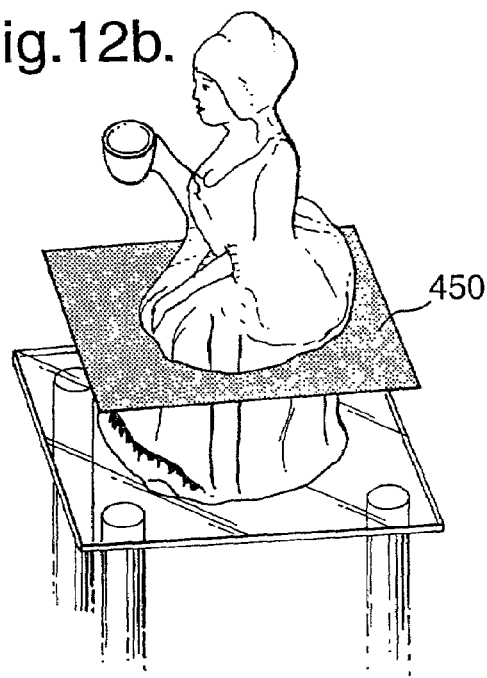
Figure 12C:
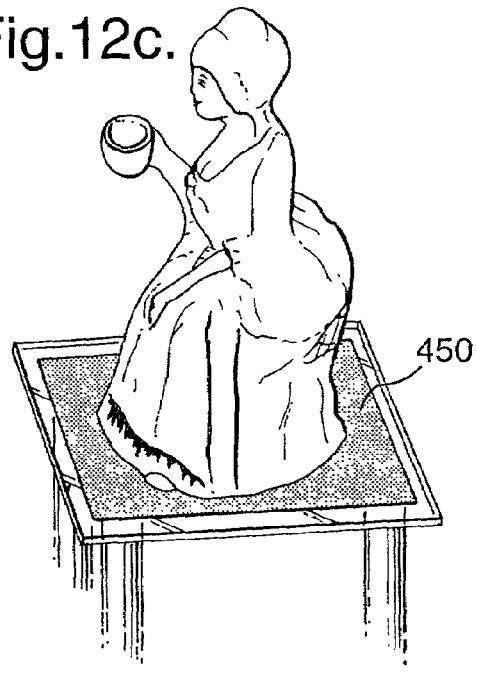

At step S11-4, referring to FIGS. 12a, 12b and 12c, object/support separator 90 moves the plane 450 up and/or down in a vertical direction in accordance with user input instructions to a final position defined by the user where the plane 450 separates the subject object 210 and object support 220 in the 3D computer model (FIG. 12c). In addition, object/support separator 90 causes display processor 110 to display the 3D computer model of the subject object 210, object support 220 and plane 450 from one or more different viewing positions and directions in accordance with user input instructions. This enables the user to view the 3D computer model from different viewpoints and move the plane 450 while viewing the 3D computer model from these viewpoints in order to ensure that the final position of the plane 450 accurately separates the subject object 210 from the object support 220 in the 3D computer model (plane 450 always being constrained to move in a direction perpendicular to the calculated plane of the photographic mat 34, which may not be a vertical direction on the display device 4 when the 3D computer model is viewed from different viewing positions and directions).

At step S11-6, in response to a user input signal indicating that the user has finished moving the plane 450, so that the plane is now in a position separating the subject object 210 and object support 220, object/support separator 90 stores the coordinates defining the final position of the plane.

At step S11-8, object/support separator 90 performs processing to delete the part of the 3D surface model generated by surface modeller 70 lying below the final position of the plane stored at step S11-6 (that is, to delete the part of the model lying on the side of the plane 450 towards the calculated plane of the photographic mat 34).

Referring to FIG. 13, to perform the processing at step S11-8, object/support separator 90 repeats the processing performed by surface modeller 70 at step S6-10, but this time amending the cuboid 400 defining the start volume for the voxel carve processing so that the horizontal bottom face 412 is moved to a position corresponding to the final position of the plane 450 stored at step S11-6. In this way, when the voxel carve processing and subsequent processing (described previously) is performed, a 3D computer model of the surface of the subject object 210 alone is generated, and the model does not include any part of the object support 220.

Referring again to FIG. 11, at step S11-10, object/support separator 90 causes display processor 110 to display an image of the 3D surface model generated at step S11-8 rendered with the appropriate texture data generated by surface texturer 80 at step S6-12 on display device 4.

At step S11-12, object/support separator 90 determines whether a user input signal has been received indicating that further changes are to be made to the 3D computer model to remove the model of the object support 220. Steps S11-4 to S11-12 are repeated until it is determined at step S11-12 that no further changes are necessary.

Referring again to FIG. 6, at step S6-16, central controller 20 outputs the data defining the 3D computer model of the subject object 210 and texture data therefor from output data store 120, for example as data stored on a storage device such as disk 122 or as a signal 124 (FIG. 1). In addition, or instead, central controller 20 may cause display processor 110 to display an image of the 3D computer model of the subject object 210 rendered with the texture data in accordance with a viewpoint input by a user, for example using a user input device 6. Alternatively, the data defining the position and orientation of the camera 230 for each input image generated at step S6-6 and the data defining the segmentation of each input image generated at step S6-8 may also be output, for example as data recorded on a storage device such as disk 122 or as a signal 124. This data may then be input into a separate processing apparatus programmed to perform steps S6-10 to S6-14.

In the first embodiment described above, object/support separator 90 processes the 3D computer model of the subject object and object support at step S6-14 to remove the object support therefrom in accordance with user input instructions defining the position of a plane 450 to separate the subject object and the object support.

However, a 3D computer model of the subject object alone (that is, without the object support) may be generated in different ways by object/support separator 90, as will be clear from the further embodiments described below.

Second Embodiment

A second embodiment of the invention will now be described. The components of the second embodiment and the processing operations performed thereby are the same as those in the first embodiment, with the exception that the object support is different and the processing operations performed by the object/support separator 90 are different, as will be described below. In addition, in the second embodiment texture data for the underside of subject object 210 is not generated from the input images by surface texturer 80 (this being inessential because the underside of the subject object 210 is of no significant interest to the user in many cases).

Figure 14:
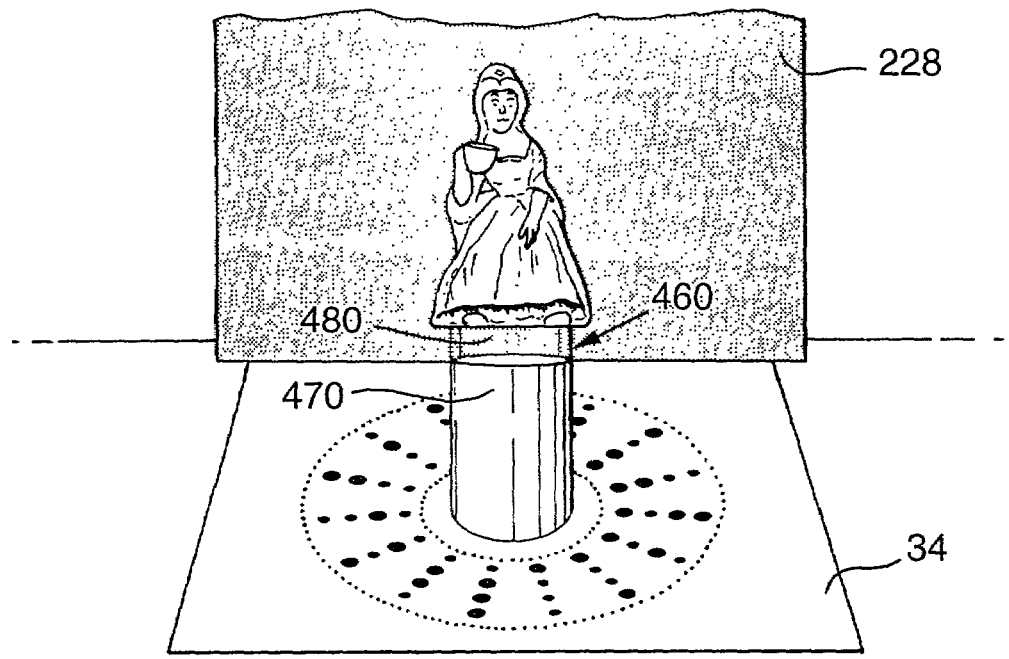
FIG. 14 illustrates an object support having a transparent top portion in a second embodiment.

Referring to FIG. 14, in the second embodiment, an object support 460 comprises a cylinder having an opaque bottom portion 470 and a transparent top portion 480.

The diameter of the object support 460 is sized so that the subject object 210 covers the entire top surface of the object support 460 when it is placed thereon. In this way, the horizontal surface on which the subject object 210 sits does not protrude beyond the edges of the base of the subject object 210. Accordingly, there is no horizontal surface adjacent the subject object 210 on which shadows can be formed, and therefore no shadows can touch the subject object 210 in an input image.

Because the top portion 480 of the object support 460 is transparent, in each input image stored at step S6-4, part of the background screen 228 will be visible between subject object 210 and the opaque bottom portion 470 of the object support 460, as shown in FIG. 14. In this way, in each input image, the subject object 210 will appear to be separated from the bottom portion 470 of the object support 460.

Consequently, in the processing performed by image data segmenter 60 at step S6-8, pixels relating to the portion of the background screen 228 between the subject object 210 and the bottom portion 470 of the object support 460 are designated as "background" pixels, while the pixels relating to the subject object 210 and the pixels relating to the bottom portion 470 of the object support 460 are designated as separated regions of "object" pixels.

Therefore, in the processing performed by surface modeller 70 at step S6-10, a 3D computer model of the subject object 210 is generated and a separate, unconnected 3D computer model of the bottom portion 470 of the object support 460 is generated.

Accordingly, in the processing performed by object/support separator 90 at step S6-14, the 3D computer model of the bottom portion 470 of the object support 460 merely needs to be distinguished from the 3D computer model of the subject object 210 and deleted.

Figure 15:
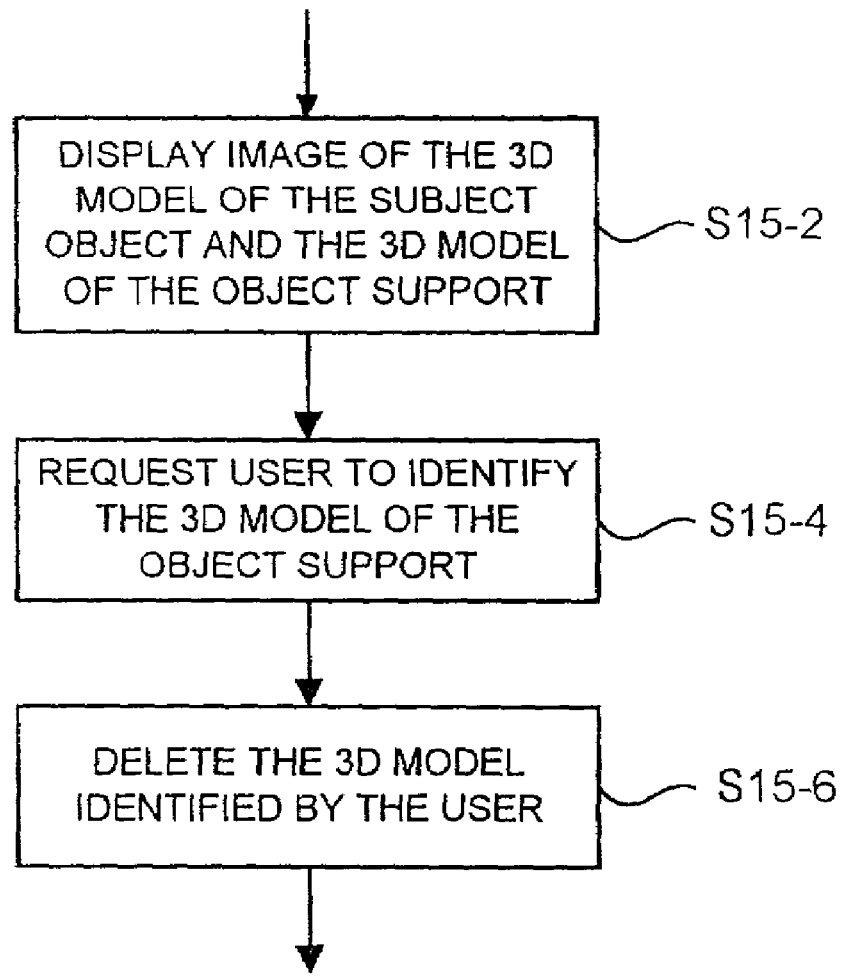
FIG. 15 shows the processing operations performed in the second embodiment at step S6-14 in FIG. 6.

FIG. 15 shows the processing operations performed by object/support separator 90 at step S6-14 in the second embodiment.

Referring to FIG. 15, at step S15-2, object/support separator 90 causes display processor 110 to display on display device 4 an image of the 3D computer model of the subject object 210 and the 3D computer model of the bottom portion 470 of the object support 460 generated by surface modeller 70 rendered with texture data generated by surface texturer 80.

At step S15-4, object/support separator 90 causes display processor 110 to display a message on display device 4 requesting the user to identify the 3D model of the bottom portion 470 of the object support 460.

At step S15-6, in response to a signal from the user input via a user input device 6 such as a mouse, object/support separator 90 deletes the 3D computer model defined in the input signal, thereby leaving the 3D computer model of the subject object 210 alone.

As a modification to this embodiment, the top portion 480 of the object support 460 may be opaque and have the same colour as the background screen 228. This has the same effect as a transparent top portion 480 because, in each input image, the top portion 480 is indistinguishable from the background screen 228.

As an alternative to the processing described above with reference to FIG. 15, object/support separator 90 may delete the 3D computer model of the bottom portion 470 of the object support 460 automatically (that is, without input from the user). More particularly, this is achieved by deleting the 3D computer model which is closest to the position of the photographic mat 34 calculated by camera calculator 50 at step S6-6, resulting in the correct 3D computer model being deleted every time because the subject object 210 is always placed on the object support 460 and is therefore always further away from the photographic mat 34 than the bottom portion 470 of the object support 460.

Third Embodiment

A third embodiment of the invention will now be described. The components of the third embodiment and the processing operations performed thereby are the same as those in the first embodiment, with the exception that the object support is different and the processing operations performed by the object/support separator 90 are different, as will be described below. In addition, as in the second embodiment, texture data for the underside of subject object 210 is not generated in the third embodiment.

In the third embodiment, the object support upon which the subject object 210 is placed for imaging comprises a cylinder, as in the second embodiment, but, in the third embodiment, the whole of the cylinder is opaque rather than part being opaque and part being transparent as in the second embodiment.

Consequently, as in the first embodiment, the 3D computer model generated by surface modeller 70 at step S6-10 comprises a 3D computer model of the subject object 210 together with the object support.

At step S6-14 in the third embodiment, object/support separator 90 performs processing to test the cross-sectional area of the 3D computer model at different positions in a direction moving away from the position of the photographic mat 34 previously calculated by camera calculator 50 at step S6-6 (that is, in an upwards direction from the base of the object support to the subject object 210). More particularly, object/support separator 90 monitors the cross-sectional area of the 3D computer model in order to detect the position at which a sudden change in the cross-sectional area occurs (this sudden change indicating the boundary between the object support and the subject object 210 provided that the base of the subject object 210 is narrower or wider than the top surface of the object support). Having detected the position at which the cross-sectional area of the 3D computer model changes, object/support separator 90 performs processing to re-generate the 3D computer model as described in the first embodiment by setting the base plane 412 of the initial volume 400 on which the voxel carve processing is performed to be the detected position at which the cross-sectional area of the 3D computer model changes.

In this way, a 3D computer model of the subject object 210 alone is generated without user input.

As an alternative to the processing described above, an object support having a substantially uniform colour which is substantially different to any colour at the bottom of the subject object 210 may be used and, instead of performing processing to detect a sudden change in the cross-sectional area of the object support, object/support separator 90 may perform processing to detect the position of a sudden change in colour of the 3D computer model when rendered with texture data generated by surface texturer 80.

In the first three embodiments described above, the 3D computer model of the subject object 210 and object support is generated (either as a single 3D computer model as in the first and third embodiments or as two separate 3D computer models as in the second embodiment) and the 3D computer model relating to the object support is subsequently removed.

However, instead, surface modeller 70 may perform processing at step S6-10 to generate data defining a 3D computer model of the subject object alone, as will be clear from the fourth embodiment described below.

Fourth Embodiment

A fourth embodiment of the invention will now be described. The components of the fourth embodiment and the processing operations performed thereby are the same as those in the first embodiment, with the exception that the height of the object support is known and is stored in processing apparatus 2 (for example the height may be input by the user), and object/support separator 90 (and consequently processing step S6-14 performed thereby) is not included and instead the processing performed by surface modeller 70 is modified. These differences will be described below.

More particularly, because the height of the object support is known and stored in processing apparatus 2, at step S6-10, surface modeller 70 sets the base plane 412 of the initial volume 400 on which to perform voxel carve processing to be at a vertical distance away from the position of the photographic mat 34 equal to the stored height of the object support. In this way, in the subsequent processing performed by surface modeller 70 at step S6-10, a 3D computer model of the subject object 210 alone is generated.

Modifications

Many modifications can be made to the embodiments described above within the scope of the claims.

For example, modifications can be made to the object support upon which the subject object 210 is placed for imaging.

Figure 16:
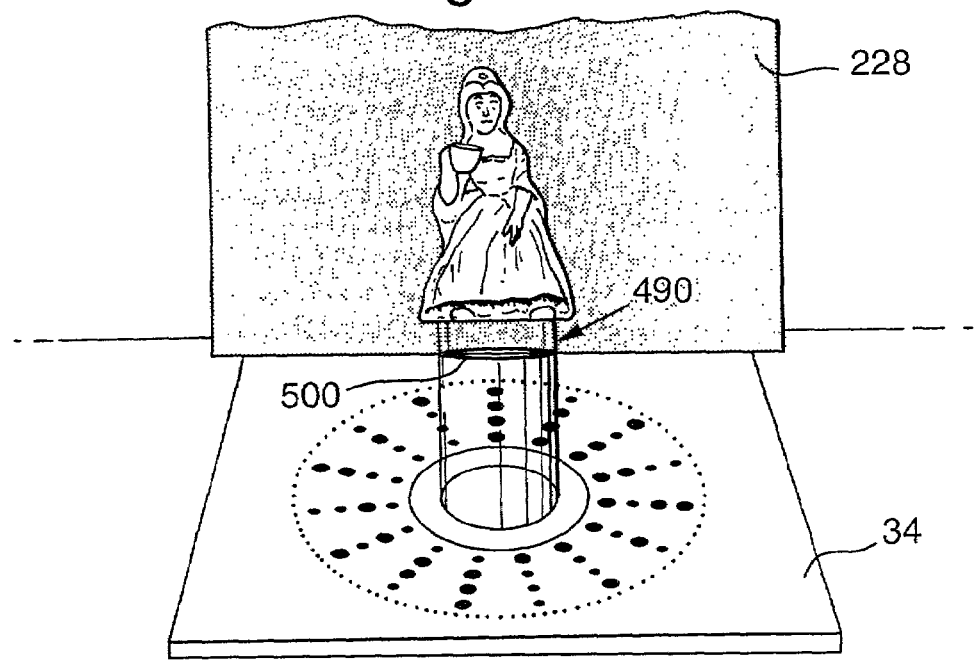
FIG. 16 shows an object support having a marker thereon to assist the user in selecting camera imaging positions and orientations in a further embodiment.

By way of a first example, the object support can be designed to assist the user in selecting an optimum position and viewing direction for camera 230 since, as described above with reference to FIGS. 4*a*–4*e*, the imaging position and direction of the camera 230 are important to ensure that the subject object 210 appears surrounded by the background screen 228 in each input image. More particularly, referring to FIG. 16, to assist the user in achieving the correct imaging position and direction, an object support 490 may be used having a marker 500 thereon so that the user can select the position and direction of the camera 230 such that the marker 500 appears at the boundary between the photographic mat 34 and the background screen 228—the marker 500 being positioned at a sufficient distance away from the top of the object support such that when this alignment occurs, the subject object 210 will always be surrounded by the background screen 228.

Figure 17:
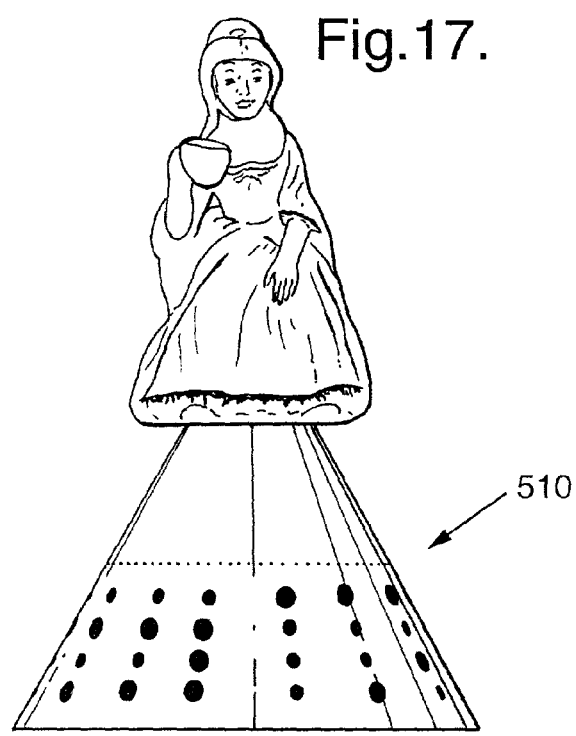
FIG. 17 illustrates an object support in a further embodiment, in which identifiable features are provided on the object support rather than on a photographic mat.

Referring to FIG. 17, the object support and photographic mat 34 may be combined by providing an object support 510 on which the pattern of features from the photographic mat 34 is printed (or otherwise marked) at a position separated from the top surface of the object support on which the subject object 210 sits.

In addition to providing features on the photographic mat 34 for detection in the input images, as in the embodiments described above, features may also be provided on the object support, and processing may be performed by camera calculator 50 to detect the features on the object support in each input image and to match the detected features between input images. The positions of the detected and matched features on the object support may then be used together with the detected positions of the features on the photographic mat 34 to calculate the positions and orientations of the input images. This is likely to increase the accuracy of the calculated positions and orientations (and hence lead to a more accurate 3D computer model of the subject object) because the features now being used to calculate the positions and orientations do not all lie in a single plane (which is the case in the embodiments described above because all of the features are on the photographic mat 34) and instead the features on the object support can be provided at different heights thereon. As an example of the way in which the detected features on the photographic mat 34 and the detected features on the object support may be used to calculate the positions and orientations of the input images, processing may be performed based on that described in EP-A-0898245 using the matches between features on the photographic mat 34 as "user-identified" matches and the matches between the features on the object support as "calculated" matches.

In addition, the features on the object support may be provided at known relative positions thereon. In this way, the positions and orientations of the input images may be calculated with further increased accuracy by using the known relative positions to constrain the solution that each calculated position and orientation can take in a conventional manner (that is, by requiring the calculated position and orientation to give imaging conditions which preserve the relative positions of the features on the object support).

Figure 18:
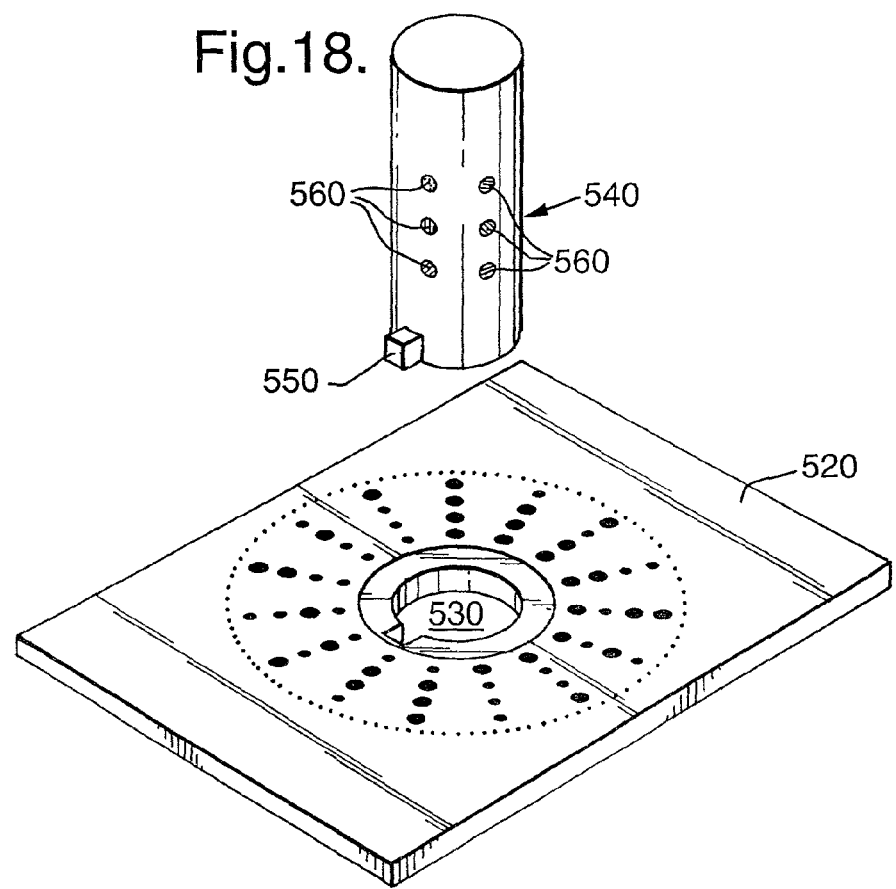
FIG. 18 illustrates a photographic mat and object support in a further embodiment, in which identifiable features are provided on both the photographic mat and object support.

Yet further, the features on the object support may be provided at known relative positions and in addition the object support and photographic mat may be arranged to interconnect so that, when connected, the positions of the features on the object support are known relative to the positions of the features on the photographic mat. More particularly, referring to FIG. 18, a photographic mat 520 may be used comprising a pattern of features on a slab of material having a hole 530 therein. An object support 540 having a plurality of features 560 each with a respective different colour and arranged at known relative positions interconnects with the photographic mat 520 by inserting the base thereof in the hole 530. The relative positions of the features on the photographic mat 520 and the features 560 on the object support 540 are fixed when the object support 540 is inserted in the hole 530 because a protrusion 550 is provided on the object support 540 which engages a notch in the hole 530.

Figure 19:
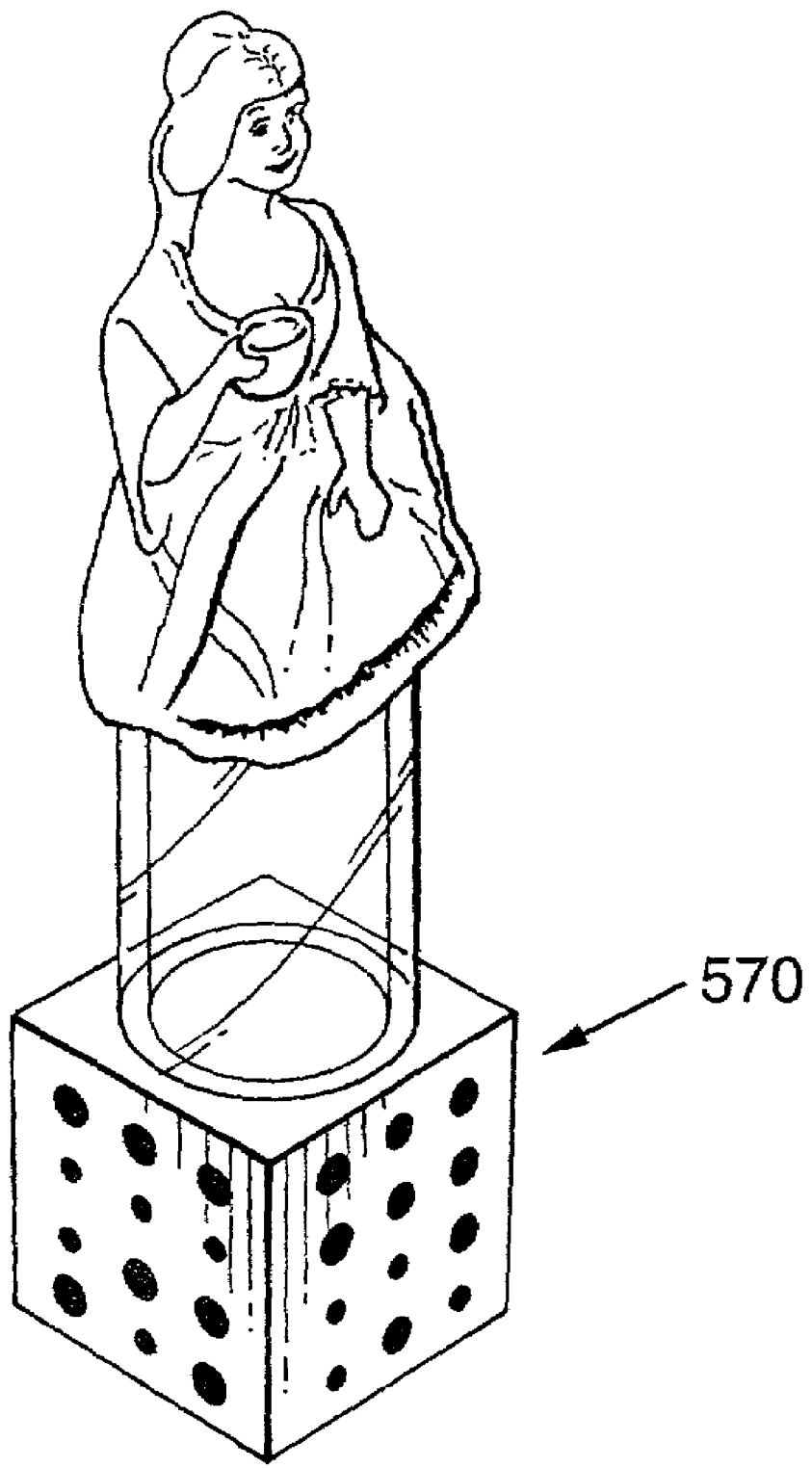
FIG. 19 illustrates a further embodiment, in which the photographic mat is replaced by a three-dimensional calibration object having identifiable features thereon.

In the embodiments described above, the calibration object on which the object support and subject object 210 are placed has the form of a two-dimensional photographic mat 34. However, instead, a three-dimensional calibration object may be used. For example, referring to FIG. 19, a calibration object 570 having the form of a cube with a pattern of features on the vertical sides thereof may be used.

The object support may be telescopic to allow the height thereof to be changed.

The object support may take the form of a spike to be inserted into the subject object 210.

In all of the embodiments described above, the object support has a flat top surface on which the subject object 210 sits. However, the subject object may be supported by separate pillars. For example, in the first embodiment, the horizontal top plate 222 of the object support may be removed and the subject object supported on the legs 224. In embodiments in which texture data is to be generated for the underside of the subject object, this arrangement would provide a reflection of at least part of the underside in the mirror 140 unaffected by distortion resulting from transmission of light through the surface on which the subject object is sitting (for example surface 222 in the first embodiment).

In all of the embodiments described above, the features of the pattern on the photographic mat 34 are arranged around an empty central area in which the object support is placed. However, the features may be provided over a photographic mat 34 without a space for the object support, and the object support may be then placed over some of the features. This will not affect the processing operations to calculate the position and orientation of each input image provided that a minimum of six features are visible in each input image.

In the embodiments described above, the object support with the subject object 210 thereon is positioned on the photographic mat 34 so that it is surrounded by the features in the pattern on the photographic mat. However, the object support with the subject object 210 thereon may be positioned on the photographic mat 34 so that it is outside the pattern of features (for example in a corner of the photographic mat 34 outside the circle of features). Similarly, the object support with the subject object 210 thereon need not be positioned on the photographic mat. For example, if camera 230 is fixed, the photographic mat 34 may be placed on a larger sheet of paper, the object support with the subject object 210 thereon may also be placed on the larger sheet but off the photographic mat 34, and the larger sheet may be rotated and/or moved between the recording of images to provide different relative positions and orientations between on the one hand the camera 230 and on the other hand the photographic mat 34, object support and subject object 210. In this way, even though the subject object 210 is not directly over the pattern of features on the photographic mat 34, the subject object 210 is still held above the pattern by the object support, and both the subject object 210 and the pattern will be visible in recorded images. Accordingly, the word "above" used herein should not be interpreted to mean that the subject object is directly over the photographic mat in a vertical direction.

In all of the embodiments described above, a 3D computer model of the subject object 210 alone is generated. However, for some applications, a 3D computer model of the subject object 210 together with the object support (or part thereof) may be acceptable. In such a case, it is unnecessary to perform processing to remove the 3D computer model of the object support.

In the first embodiment described above, in the processing performed by object/support separator 90 at step S6-14, the plane 450 displayed to the user for movement to separate the subject object 210 from the object support 220 has a width which exceeds the width of any part of the 3D computer model of the subject object 210. Similarly, before re-performing voxel carve processing, object/support separator 90 moves the base plane 412 of the initial volume 400 to remove the entire bottom portion of the volume 400 beneath the base plane 412. This processing is satisfactory when, as shown in FIG. 5, every part of the subject object 210 is above the top of the object support 220. However, a situation may arise in which part of the subject object 210 overhangs the top of the object support 220 so that, using the processing described in the first embodiment, it would not be possible to separate the subject object 210 and object support 220 using the plane 450. Accordingly, as an alternative, at step S6-14, object/support separator 90 may display a plane 450 having the same shape and cross-sectional area as the object support 220 and, when amending the initial volume 400 on which to perform voxel carve processing, instead of moving the base plane 412, a hole may be created in the volume 400 having a cross-sectional area and shape corresponding to that of the plane 450 displayed to the user and extending from the original base plane 412 to a position corresponding to the final position of the plane 450 stored at step S11-6. The initial volume 400 may also be amended in a similar way in the third and fourth embodiments to take account of situations in which the subject object 210 overhangs the top of the object support.

As an alternative method of performing processing to remove the 3D computer model of the object support from the 3D computer model of the subject object and object support together, a 3D computer model of the object support may be pre-generated and pre-stored in processing apparatus 2 (for example by performing the processing described previously without the subject object 210 present when the input images are recorded) and then processing may be performed by object/support separator 90 to match the pre-stored model of the object support to part of the 3D model of the subject and object support together, and to remove the detected matching part.

In the embodiments described above, the printer 8 prints photographic mat 34 on a single sheet of paper. However, mat generator 30 may control printer 8 to print the photographic mat on separate sheets of paper, which can then be placed together to form the photographic mat 34.

Rather than printing the photographic mat on a recording medium or displaying the photographic mat on display panel 10, the features of the photographic mat may be marked (for example painted) on a surface such as a floor.

In the first embodiment described above, in order to generate texture data for the underside of the subject object 210, the sheet of paper on which the photographic mat is printed has a hole 130 cut therein and is attached to a mirror 140. However, instead, a mirror, or other suitably reflective material, may be provided on top of the sheet of paper at a position corresponding to that where the hole 130 would have been cut. Similarly, if the photographic mat is displayed on display panel 10, a mirror or other reflective material may be placed on the display panel. Alternatively, the pattern of features of the photographic mat may be printed, or otherwise marked on a mirror or other reflective surface.

Figure 20A:
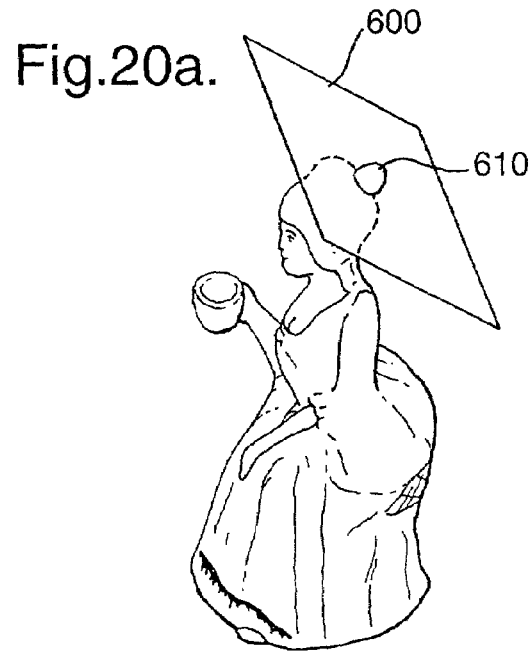
FIGS. 20a and 20b illustrate how a three-dimensional computer model may be edited using a plane of variable position and orientation in all embodiments.
Figure 20B:
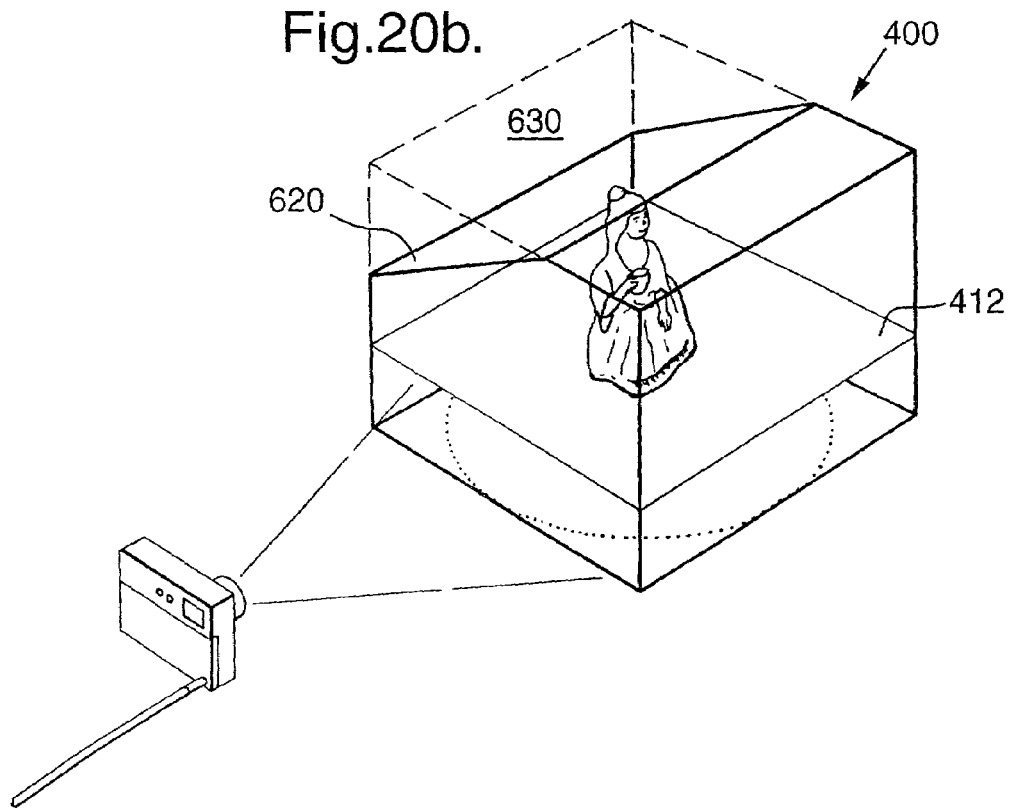

In the first embodiment described above, in the processing performed by object/support separator 90 at step S6-14, the 3D computer model generated by surface modeller 70 is amended by moving the base plane 412 of the initial volume 400 on which voxel carve processing is to be performed to a position corresponding to the position of plane 450 previously moved by the user. In addition, the same technique may be used to amend the 3D computer model to correct any errors therein. More particularly, referring to FIG. 20a, processing apparatus 2 may display an image of the 3D computer model together with a plane 600 which can be moved by a user using a user input device 6 to any position and orientation. In this way, the user can move the plane 600 to a position which separates any unwanted part of the computer model, such as part 610 in FIG. 20a, which protrudes from the wanted part. As in the processing described above with reference to FIG. 11, processing apparatus 2 stores the final position of the plane 600 moved by the user and, referring to FIG. 20b, amends the initial volume 400 on which voxel carve processing s to be performed by setting a plane 620 at a position in the volume 400 corresponding to the position of the plane 600 defined by the user, and removing the portion 630 from the initial volume 400 excluded by the plane 620. Processing apparatus 2 then re-performs the voxel carve processing and, as a result, the unwanted portion 610 of the 3D computer model is removed because this part lies in the volume 630 excluded from the voxel carve processing.

In the embodiments described above, at step S6-4, data input by a user defining the intrinsic parameters of camera 230 is stored. However, instead, default values may be assumed for some, or all, of the intrinsic camera parameters, or processing may be performed to calculate the intrinsic parameter values in a conventional manner, for example as described in "Euclidean Reconstruction From Uncalibrated Views" by Hartley in Applications of Invariance in Computer Vision, Mundy, Zisserman and Forsyth eds, pages 237–256, Azores 1993.

In the embodiments described above, image data from an input image relating to the subject object 210 and object support is segmented from the image data relating to the photographic mat 34, surface 200 and background screen 228 as described above with reference to FIG. 7. However, other conventional segmentation methods may be used instead. For example, a segmentation method may be used in which a single RGB value representative of the colour of the photographic mat 34, surface 200 and background screen 228 is stored and each pixel in an input image is processed to determine whether the Euclidean distance in RGB space between the RGB background value and the RGB pixel value is less than a specified threshold.

In the embodiments described above, the processing at steps S6-10 and S6-14 to generate data defining a 3D computer model is carried out using a voxel carving technique. However, other techniques may be used, such as a voxel colouring technique for example as described in University of Rochester Computer Sciences Technical Report Number 680 of January 1998 entitled "What Do N Photographs Tell Us About 3D Shape?" and University of Rochester Computer Sciences Technical Report Number 692 of May 1998 entitled "A Theory of Shape by Space Carving", both by Kiriakos N. Kutulakos and Stephen M. Seitz.

In the embodiments described above, processing is performed by a computer using processing routines defined by programming instructions. However, some, or all, of the processing could be performed using hardware.

The invention claimed is:

1. A method of recording images of a subject object from different positions and orientations and processing the recorded image data to generate a three-dimensional computer model of the subject object, said method comprising the steps of:
   supporting the subject object above a calibration object having a predetermined pattern of features using an object support having a known height;
   recording at different positions and orientations a plurality of images of the subject object supported above the calibration object;
   processing the recorded image data to calculate the position and orientation at which each of at least some of the images were recorded; and
   generating, using the calculated positions and orientations, data defining a three-dimensional computer model of the subject object by defining a volume of voxels in a three-dimensional space in dependence upon the known height of the object support such that the object support, but not the subject object, is excluded from the volume, and removing voxels from the volume in dependence upon the image data.

2. A method according to claim 1, wherein the images of the subject object, supported above the calibration object, are recorded with a background of a substantially uniform color behind the subject object such that, in each recorded image, the outline of the subject object is surrounded by the background except where the outline touches the support.

3. A method according to claim 2, wherein the background is provided by a background screen.

4. A method according to claim 1,
   wherein the subject object is supported by at least one surface of the object support standing on the calibration object, and
   wherein each surface of the object support supporting the subject object does not protrude substantially from beneath the subject object.

5. A method according to claim 1,
   wherein the object support has calibration features thereon, and
   wherein said processing step of calculating the position and orientation at which each of at least some of the images were recorded includes detecting calibration features on the object support in image data and using the positions of the detected features to calculate the positions and orientations at which the images were recorded.

6. A method according to claim 5, wherein data defining the relative positions of the calibration features on the object support is prestored and used to calculate the positions and orientations at which the images were recorded.

7. A method according to claim 5,
   wherein the object support is arranged relative to the calibration object in a predetermined configuration, and
   wherein data defining the positions of the calibration features on the object support relative to the positions of the features on the calibration object is prestored and used to calculate the positions and orientations at which the images were recorded.

8. A method according to claim 1,
   wherein the subject object is supported above a reflective surface, and
   wherein processing is carried out to generate texture data for the three-dimensional computer model of the subject object in dependence upon image data that corresponds to reflections in the reflective surface.

9. A method according to claim 1, wherein the calibration object is three-dimensional.

10. A method according to claim 1, wherein the object support and the calibration object are formed as one, with the subject object being supported thereby above the predetermined pattern of features thereon.

11. A method of processing image data defining a plurality of images recorded at different positions and orientations of a subject object supported by an object support having a known height above a calibration object having a predetermined pattern of features, said method comprising the steps of:
   calculating the positions and orientations at which at least some of the images were recorded by processing the image data; and
   generating, using the calculated positions and orientations, data defining a three-dimensional computer model of the subject object but not the object support by defining a volume of voxels in a three-dimensional space in dependence upon the known height of the object support such that the object support, but not the subject object, is excluded from the volume, and removing voxels from the volume in dependence upon the image data.

12. A method according to claim 11, wherein said calculating step of calculating the positions and orientations at which at least some of the images were recorded includes detecting matching features in the image data defining respective images corresponding to features on the object support.

13. A method of processing image data to generate a three-dimensional computer model, said method comprising the steps of:
receiving image data defining at least in part a plurality of images of a subject object supported by an object support having a known height recorded at different relative positions and orientations;
receiving data defining the positions and orientations at which the images were recorded; and
generating data, by processing the received data, defining a three-dimensional computer model of the subject object but not the object support by performing processing using at least one known parameter of the object support to generate data defining the three-dimensional computer model of the subject object without generating data defining a three-dimensional computer model of the object support, by defining a volume of voxels in a three-dimensional space in dependence upon the known height of the object support such that the object support, but not the subject object, is excluded from the volume, and removing voxels from the volume in dependence upon the image data.

14. A method according to claim 11, or claim 13, wherein the generation of the data defining the three-dimensional computer model includes generating texture data using the image data.

15. A method according to claim 14, wherein the generation of the texture data includes processing the image data to identify data corresponding to a reflection of the subject object in a reflective surface, and using the identified data to generate texture data for a surface of the three-dimensional computer model.

16. A method according to claim 11, or claim 13, further comprising generating a signal conveying data defining the three-dimensional computer model of the subject object.

17. A method according to claim 16, further comprising recording the signal either directly or indirectly.

18. A system for recording images of a subject object from different positions and orientations and for processing the recorded image data to generate a three-dimensional computer model of the subject object, said system comprising:
a calibration object having a predetermined pattern of features;
an object support having a known height for supporting the subject object higher than the calibration object;
an imager operable to record, at different positions and orientations, a plurality of images of the subject object supported higher than the calibration object; and
an image data processing apparatus, comprising:
a position and orientation calculator operable to process the recorded image data to calculate the position and orientation at which each of at least some of the images were recorded; and
a computer model generator operable to perform processing using the calculated positions and orientations to generate data defining a three-dimensional computer model of the subject object, by defining a volume of voxels in a three-dimensional space in dependence upon the known height of said object support such that said object support, but not the subject object, is excluded from the volume, and removing voxels from the volume in dependence upon the image data.

19. A system according to claim 18, further comprising a screen having a substantially uniform color for placing behind the subject object so that images of the subject object supported higher than the calibration object can be recorded with the screen behind the subject object such that, in each recorded image, the outline of the subject object is surrounded by the background except where the outline touches the support.

20. A system according to claim 18, wherein said object support is arranged such that, when the subject object sits thereon, no surface supporting the subject object protrudes substantially from beneath the subject object.

21. A system according to claim 18, wherein:
said object support has calibration features thereon; and
said position and orientation calculator is operable to detect calibration features on said object support in image data and use the positions of the detected features to calculate the positions and orientations at which the images were recorded.

22. A system according to claim 21, wherein:
said image data processing apparatus includes a data store for prestoring data defining the relative positions of the calibration features on the object support, and
said position and orientation calculator is operable to use prestored data from the data store to calculate the positions and orientations at which the images were recorded.

23. A system according to claim 21, wherein:
said object support is arranged to connect to said calibration object in a predetermined configuration;
said image data processing apparatus includes a data store for prestoring data defining the positions of the calibration features on said object support relative to the positions of the features on the calibration object when said object support is connected to said calibration object; and
said position and orientation calculator is operable to use prestored data from the data store to calculate the positions and orientations at which the images were recorded.

24. A system according to claim 18, wherein:
said calibration object has a reflective surface; and
said image data processing apparatus includes a texture generator operable to generate texture data for the three-dimensional computer model of the subject object in dependence upon image data that corresponds to reflections in the reflective surface.

25. A system according to claim 18, wherein said calibration object is three-dimensional.

26. A system according to claim 18, wherein said object support and said calibration object are formed as one with a surface for supporting the subject object such that, when the subject object sits thereon, the subject object is supported higher than, and separated from, the predetermined pattern of features.

27. An apparatus operable to process image data defining a plurality of images recorded at different positions and orientations of a subject object supported by an object support having a known height higher than a calibration object having a predetermined pattern of features, said apparatus comprising:
a position and orientation calculator operable to process the image data to calculate the positions and orientations at which at least some of the images were recorded; and a computer model generator operable to perform processing using the calculated positions and orientations to generate data defining a three-dimensional computer model of the subject object but not the object support, by defining a volume of voxels in a three-dimensional space in dependence upon the known height of the object support such that the object support, but not the subject object, is excluded from the volume, and removing voxels from the volume in dependence upon the image data.

28. An apparatus according to claim 27, wherein said position and orientation calculator includes a feature matcher operable to detect matching features in the image data defining respective images corresponding to features on the object support.

29. An apparatus operable to process image data to generate a three-dimensional computer model, said apparatus comprising:
an image data receiver for receiving image data defining at least in part a plurality of images of a subject object supported by an object support having a known height recorded at different relative positions and orientations;
a position and orientation data receiver for receiving data defining the positions and orientations at which the images were recorded; and
a computer model generator operable to process the received data to generate data defining a three-dimensional computer model of the subject object but not the object support using at least one known parameter of the object support to generate data defining the three-dimensional computer model of the subject object without generating data defining a three-dimensional computer model of the object support, by defining a volume of voxels in a three-dimensional space in dependence upon the known height of the object support such that the object support, but not the subject object, is excluded from the volume, and removing voxels from the volume in dependence upon the image data.

30. An apparatus according to claim 29, wherein said computer model generator includes:
a voxel generator operable to define the volume of voxels in the three-dimensional space with the base plate of the volume set to be at a height higher than the calibration object corresponding to the known height of the object support; and
a voxel remover operable to remove the voxels from the volume in dependence upon the image data.

31. An apparatus according to claim 27, or claim 29 wherein said computer model generator includes a texture data generator operable to generate texture data using the image data.

32. An apparatus according to claim 31, wherein:
said texture data generator includes a reflection data identifier operable to process the image data to identify data corresponding to a reflection of the subject object in a reflective surface, and
said texture data generator is operable to use the identified data to generate texture data for a surface of the three-dimensional computer model.

33. A storage device storing computer program instructions to program a programmable processing apparatus to become operable to perform a method as set out in claim 11 or claim 13.

34. A physically-embodied computer program product carrying computer program instructions in computer-readable form, including instructions to program a programmable processing apparatus to become operable to perform a method as set out in claim 11 or claim 13.

35. A system for recording images of a subject object from different positions and orientations and for processing the recorded image data to generate a three-dimensional computer model of the subject object, said system comprising:
a calibration object having a predetermined pattern of features;
an object support having a known height for supporting the subject object higher than said calibration object;
an imager for recording, at different positions and orientations, a plurality of images of the subject object supported higher than said calibration object; and
an image data processing apparatus, comprising:
means for processing the recorded image data to calculate the position and orientation at which each of at least some of the images were recorded; and
means for performing processing using the calculated positions and orientations to generate data defining a three-dimensional computer model of the subject object, by defining a volume of voxels in a three-dimensional space in dependence upon the known height of said object support such that said object support, but not the subject object, is excluded from the volume, and removing voxels from the volume in dependence upon the image data.

36. An apparatus for processing image data defining a plurality of images recorded at different positions and orientations of a subject object supported by an object support having a known height higher than a calibration object having a predetermined pattern of features, said apparatus comprising:
means for processing the image data to calculate the positions and orientations at which at least some of the images were recorded, and
means for performing processing using the calculated positions and orientations to generate data defining a three-dimensional computer model of the subject object but not the object support, by defining a volume of voxels in a three-dimensional space in dependence upon the known height of the object support such that the object support, but not the subject object, is excluded from the volume, and removing voxels from the volume in dependence upon the image data.

37. An apparatus for processing image data to generate a three-dimensional computer model, said apparatus comprising:
means for receiving image data defining at least in part a plurality of images of a subject object supported by an object support having a known height recorded at different relative positions and orientations;
means for receiving data defining the positions and orientations at which the images were recorded; and
means for processing the received data to generate data defining a three-dimensional computer model of the subject object but not the object support using at least one known parameter of the object support to generate data defining the three-dimensional computer model of the subject object without generating data defining a three-dimensional computer model of the object support, by defining a volume of voxels in a three-dimensional space in dependence upon the known height of the object support such that the object support, but not the subject object, is excluded from the volume, and removing voxels from the volume in dependence upon the image data.

* * * * *

UNITED STATES PATENT AND TRADEMARK OFFICE
CERTIFICATE OF CORRECTION

PATENT NO.         : 7,079,679 B2
APPLICATION NO. : 09/963635
DATED              : July 18, 2006
INVENTOR(S)        : Richard Antony Kirk et al.

It is certified that error appears in the above-identified patent and that said Letters Patent is hereby corrected as shown below:

Title Page, [75] INVENTORS:

"Richard Antony Kirk, Hertfordshire (GB);" should read --Richard Antony Kirk, Redbourn (GB);--.

**Title Page, [*] Notice**:

"838 days" should read --836 days--.

Title Page, [56] REFERENCES CITED:

FOREIGN PATENT DOCUMENTS, "JP    9170914" should read --JP    9-170914--.
OTHER PUBLICATIONS, "unclibrated" should read --Uncalibrated--.

COLUMN 1:

Line 28, "is" should read --it--.

COLUMN 6:

Line 61, "she" should read --the--.

Signed and Sealed this

Eighteenth Day of December, 2007

JON W. DUDAS
*Director of the United States Patent and Trademark Office*